United States Patent
Kubota

(10) Patent No.: US 11,305,603 B2
(45) Date of Patent: Apr. 19, 2022

(54) SUSPENSION SYSTEM AND VEHICLE

(71) Applicant: Yamaha Hatsudoki Kabushiki Kaisha, Shizuoka (JP)

(72) Inventor: Takahiko Kubota, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/835,253

(22) Filed: Mar. 30, 2020

(65) Prior Publication Data

US 2020/0307341 A1 Oct. 1, 2020

(30) Foreign Application Priority Data

Apr. 1, 2019 (JP) .............................. JP2019-070174

(51) Int. Cl.
*B60G 17/04* (2006.01)
*B60G 15/12* (2006.01)
*B60G 21/073* (2006.01)

(52) U.S. Cl.
CPC ......... *B60G 17/0424* (2013.01); *B60G 15/12* (2013.01); *B60G 21/073* (2013.01); *B60G 2202/154* (2013.01); *B60G 2300/322* (2013.01)

(58) Field of Classification Search
CPC .. B60G 17/0424; B60G 15/12; B60G 21/073; B60G 2202/154; B60G 2300/322; B60G 2204/82; B60G 2204/8304; B60G 17/0416; F16F 9/096; F16F 9/08
See application file for complete search history.

(56) References Cited

U.S. PATENT DOCUMENTS

| | | | | |
|---|---|---|---|---|
| 1,963,533 A | | 6/1934 | Svensson | |
| 2,843,396 A | | 7/1958 | Lucien | |
| 3,112,923 A | * | 12/1963 | Ley ........................ | B60G 15/12 267/186 |
| 3,854,710 A | * | 12/1974 | Nicholls ............ | B60G 17/0424 280/6.159 |
| 4,275,900 A | | 6/1981 | Andreoli et al. | |

(Continued)

FOREIGN PATENT DOCUMENTS

| | | |
|---|---|---|
| DE | 3942654 A1 | 6/1991 |
| DE | 102011115402 A1 * 4/2012 | ................ F16F 9/46 |

(Continued)

OTHER PUBLICATIONS

Search Report of Aug. 28, 2020, for corresponding EP Patent Application No. 20167077.5.

(Continued)

*Primary Examiner* — Paul N Dickson
*Assistant Examiner* — Kurtis Nielson
(74) *Attorney, Agent, or Firm* — HEA Law PLLC

(57) ABSTRACT

Provided is a suspension system capable of expanding one of an oil chamber and a gas chamber of an intermediate unit and contracting the other when a damper compresses or expands without generating friction in the intermediate unit. The intermediate unit includes an intermediate case having an intermediate oil chamber connected to an oil chamber of a right damper and the oil chamber of a left damper and an intermediate gas chamber, and a diaphragm made of a flexible material, which partitions the intermediate oil chamber and the intermediate gas chamber.

18 Claims, 16 Drawing Sheets

(56) References Cited

U.S. PATENT DOCUMENTS

| | | | | |
|---|---|---|---|---|
| 4,311,302 | A * | 1/1982 | Heyer | F16F 9/096 |
| | | | | 188/322.22 |
| 4,478,431 | A * | 10/1984 | Muller | B60G 11/30 |
| | | | | 267/64.25 |
| 4,497,505 | A * | 2/1985 | Harrison | B60G 21/026 |
| | | | | 280/124.101 |
| 5,486,018 | A | 1/1996 | Sakai | |
| 5,794,966 | A | 8/1998 | Macleod | |
| 5,996,978 | A * | 12/1999 | Asanuma | F16F 9/585 |
| | | | | 267/221 |
| 6,024,366 | A * | 2/2000 | Masamura | B60G 17/0416 |
| | | | | 280/124.162 |
| 6,250,658 | B1 * | 6/2001 | Sakai | B60G 17/0162 |
| | | | | 267/64.17 |
| 6,318,525 | B1 * | 11/2001 | Vignocchi | B60G 15/063 |
| | | | | 188/266.6 |
| 10,144,444 | B2 | 12/2018 | Sawai et al. | |
| 10,315,483 | B2 | 6/2019 | Sawai | |
| 2004/0020730 | A1 * | 2/2004 | Turner | F16F 9/512 |
| | | | | 188/322.13 |
| 2005/0012255 | A1 * | 1/2005 | Denk | B60G 17/0432 |
| | | | | 267/64.15 |
| 2011/0068552 | A1 | 3/2011 | Ryan et al. | |
| 2013/0144489 | A1 * | 6/2013 | Galasso | B60G 17/015 |
| | | | | 701/37 |
| 2013/0264784 | A1 * | 10/2013 | Venton-Walters | |
| | | | | B60G 17/0525 |
| | | | | 280/6.157 |
| 2016/0319897 | A1 * | 11/2016 | Mochizuki | F16F 9/096 |
| 2018/0072126 | A1 * | 3/2018 | Sawai | F16F 9/466 |
| 2019/0077210 | A1 * | 3/2019 | Moroni | B60G 17/0424 |
| 2020/0307342 | A1 * | 10/2020 | Kubota | B60G 17/033 |

FOREIGN PATENT DOCUMENTS

| | | | | |
|---|---|---|---|---|
| EP | 0980774 | A2 | 2/2000 | |
| EP | 1419911 | A2 | 5/2004 | |
| EP | 3293023 | A1 | 3/2018 | |
| FR | 1228272 | A * | 8/1960 | B60G 17/048 |
| GB | 931300 | A * | 7/1963 | B60G 21/06 |
| GB | 1311646 | A * | 3/1973 | B60G 17/04 |
| JP | 60203515 | A * | 10/1985 | B60G 17/04 |
| JP | H08-132846 | A | 5/1996 | |
| JP | 2000135910 | A * | 5/2000 | B60G 21/106 |
| JP | 2017-136918 | | 8/2017 | |
| JP | 2018-039481 | A | 3/2018 | |
| WO | WO-2014075661 | A * | 5/2014 | F16F 1/46 |
| WO | 2017157976 | A1 | 9/2017 | |

OTHER PUBLICATIONS

Search Report of Aug. 28, 2020, for relating EP Patent Application No. 20167079.1.

Office Action dated Aug. 6, 2021, for corresponding U.S. Appl. No. 16/835,335 pp. 1-25.

* cited by examiner

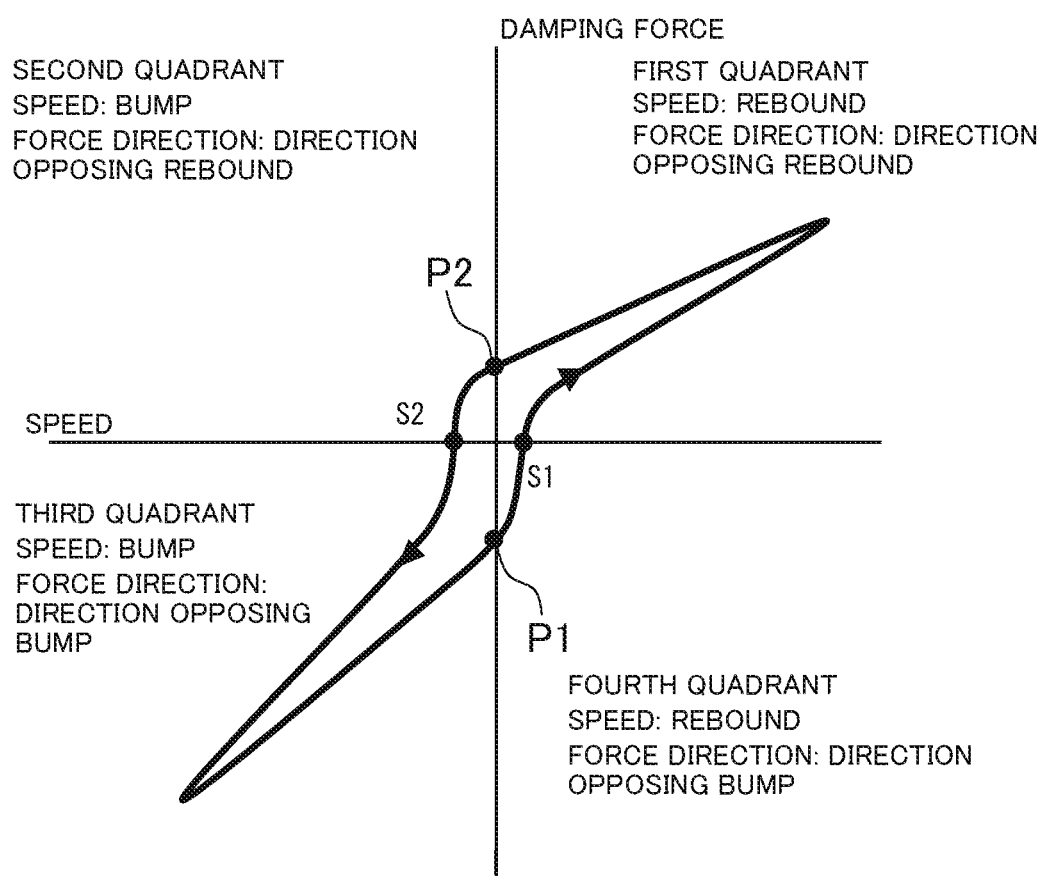

SUSPENSION SYSTEM AND VEHICLE

CROSS-REFERENCE TO RELATED APPLICATION

The present application claims priority from Japanese application JP2019-070174 filed on Apr. 1, 2019, the content of which is hereby incorporated by reference, in its entirety, into this application.

FIELD OF THE INVENTION

The present disclosure relates to a suspension system included in a vehicle such as a four-wheeled vehicle or a snowmobile.

BACKGROUND OF THE INVENTION

Description of the Related Art

JP 2017-136918A and JP H8-132846A disclose a suspension system having an intermediate unit disposed between a right damper and a left damper. The intermediate unit has an oil chamber (referred to as "intermediate oil chamber") and a gas chamber (referred to as "intermediate gas chamber"), partitioned by a free piston. The free piston can move in an axial direction in a case (cylinder) forming the intermediate unit according to expansion and contraction of the intermediate oil chamber. The intermediate oil chamber is connected to oil chambers of left and right dampers. The connections allow oil flow between the oil chamber of each damper and the intermediate oil chamber and oil flow between the oil chambers of the left and right dampers via the intermediate oil chamber. Such an intermediate unit improves a damping function at a time when a wheel rides on a bump and a damping function at time when a vehicle turns.

SUMMARY OF THE INVENTION

When the free piston moves in the intermediate unit, an outer peripheral surface of the free piston slides against an inner surface of the cylinder. This may result in a slight friction between the outer peripheral surface of the piston and the inner surface of the cylinder, though the friction is not so large that the function of the damper is impaired.

(1) An example of a suspension system proposed in the present disclosure includes a first damper having a cylinder in which an oil chamber is formed, a second damper having a cylinder in which an oil chamber is formed, and an intermediate unit. The intermediate unit includes a case having an intermediate oil chamber connected to the oil chamber of the first damper and the oil chamber of the second damper and an intermediate gas chamber. The intermediate unit includes a diaphragm which is formed of a flexible material and partitions the intermediate gas chamber from the intermediate oil chamber. In this suspension system, a flexible diaphragm is used instead of a free piston. Therefore, unlike systems which use free pistons, when one of the intermediate oil chamber and the intermediate gas chamber expands and the other contracts due to the compression/expansion of the damper, it is possible to suppress the occurrence of friction in the intermediate unit.

(2) In the suspension system of (1), the diaphragm may be made of rubber.

(3) In the suspension system according to (1) or (2), the diaphragm may have an outer peripheral edge of which a position in the case is fixed. The diaphragm may have a shape bulging from the outer peripheral edge toward the intermediate oil chamber. According to this shape of the diaphragm, the area of the diaphragm is large, so that the diaphragm can be smoothly bent. As a result, when the damper compresses or expands, one of the intermediate oil chamber and the intermediate gas chamber can expand smoothly and the other can contract smoothly.

(4) In the suspension system according to any one of (1) to (3), the case may have a cylindrical main body which includes an open end portion and a lid member which closes the end portion of the cylindrical main body. The diaphragm may have an outer peripheral edge of which a position is fixed. The outer peripheral edge may be attached to the cylindrical main body by the lid member. According to this structure, the work of attaching the diaphragm to the intermediate unit can be simplified.

(5) In the suspension system according to (4), the lid member may have an annular outer peripheral portion, a central portion fitted inside the outer peripheral portion, and a sealing member disposed between the outer peripheral portion and the central portion. The sealing member may be located inside the outer peripheral edge of the diaphragm. According to this structure, it is easy to increase the contact pressure between the outer peripheral edge of the diaphragm and the inner surface of the cylindrical main body.

(6) In the suspension system according to (4), the lid member may be formed with a gas pressure adjusting hole, which is a hole that allows gas to be injected into and discharged from the intermediate gas chamber. According to this structure, the work of optimizing the gas pressure in the intermediate gas chamber can be facilitated.

(7) In the suspension system according to any one of (1) to (6), the intermediate unit may have a first damping force generating mechanism located on a first oil flow path which is a flow path between the intermediate oil chamber and the oil chamber of the first damper, and a second damping force generating mechanism located on a second oil flow path which is a flow path between the intermediate oil chamber and the oil chamber of the second damper. According to this structure, the damping force can be optimized according to the driving situation. For example, the balance between the damping force obtained when the vehicle body rolls and the damping force obtained when the vehicle body pitches, can be optimized.

(8) In the suspension system according to (7), the intermediate unit may include a bypass flow path connecting the first oil flow path and the second oil flow path without passing through the first damping force generating mechanism and the second damping force generating mechanism, and a valve to open or close the bypass flow path. According to this structure, the use of the bypass flow path can facilitate the movement of oil between the two dampers.

(9) In the suspension system according to (7), the first damping force generating mechanism and the second damping force generating mechanism may be provided at one end portion of the case. The outer peripheral edge of the diaphragm may be positioned in the other end portion of the case. Further, the diaphragm may have a shape which bulges from the outer peripheral edge of the diaphragm toward the first damping force generating mechanism and the second damping force generating mechanism. According to this arrangement of the diaphragm, when oil flows into the intermediate oil chamber through the two damping force generating mechanisms, the diaphragm bends in a concave manner. As a result, the expansion of the intermediate oil chamber can occur smoothly.

(10) In the suspension system according to (9), the case may have a cylindrical main body which includes an open end portion and a lid member which closes the end portion of the cylindrical main body. The outer peripheral edge of the diaphragm may be attached to the cylindrical main body by the lid member. According to this structure, the work of attaching the diaphragm to the intermediate unit can be simplified.

(11) In the suspension system according to (9), the diaphragm may be bulged in a first direction and the first damping force generating mechanism and the second damping force generating mechanism may be symmetrically arranged with respect to a plane passing through a center of the diaphragm when the intermediate unit is viewed in the first direction. This can prevent pressure from acting unevenly on the outer surface of the diaphragm.

(12) In the suspension system according to any one of (1) to (11), a surface area of the diaphragm may be larger than the sum of a cross-sectional area of the cylinder of the first damper and a cross-sectional area of the cylinder of the second damper. According to this structure, the area of the diaphragm can be sufficiently secured, so that the diaphragm can be smoothly bent.

(13) In the suspension system of any one of (1) to (12), each of the first damper and the second damper may have a piston disposed within the cylinder and a piston rod extending from the piston and protruding from the cylinder. The piston rod of the first damper has a part which is located within the cylinder when the first damper is in a most compressed state, and the piston rod of the second damper similarly has a part which is located within the cylinder when the second damper is in a most compressed state. The part of the piston rod of the first damper has a first volume, and the part of the piston rod of the second damper has a second volume. A capacity of the intermediate gas chamber may be larger than the sum of the first volume and the second volume. By increasing the capacity of the intermediate gas chamber in this way, the piston movement of the damper can be smoothed.

(14) An example of a vehicle proposed in the present disclosure may include the suspension system according to any one of (1) to (13), a vehicle body frame, and wheels or skis connected to the frame through the suspension system.

BRIEF DESCRIPTION OF THE DRAWINGS

The present invention is illustrated by way of example and not limited in the figures of the accompanying drawings in which like references indicate similar elements.

FIG. 6A is a damping force characteristic diagram for explaining the responsiveness of the suspension system;

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises", "comprising", "includes", and/or "including", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of technologies are disclosed. Each of these has individual benefit and each can also be used in conjunction with one or more, or in some cases all, of the other disclosed technologies. Accordingly, for the sake of clarity, this description will refrain from repeating every possible combination of the individual technologies in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by referencing the appended figures representing embodiments. In this specification, a suspension system 10 illustrated in FIG. 1 and the like will be described as an example of a suspension system proposed in the present disclosure. The suspension system 10 is mounted on vehicles such as snowmobiles and four-wheeled vehicles. The four-wheeled vehicle includes, for example, a passenger car, an All-Terrain Vehicle (ATV), a Recreational Off-highway Vehicle (ROV), a golf cart, and the like.

Figure 1:
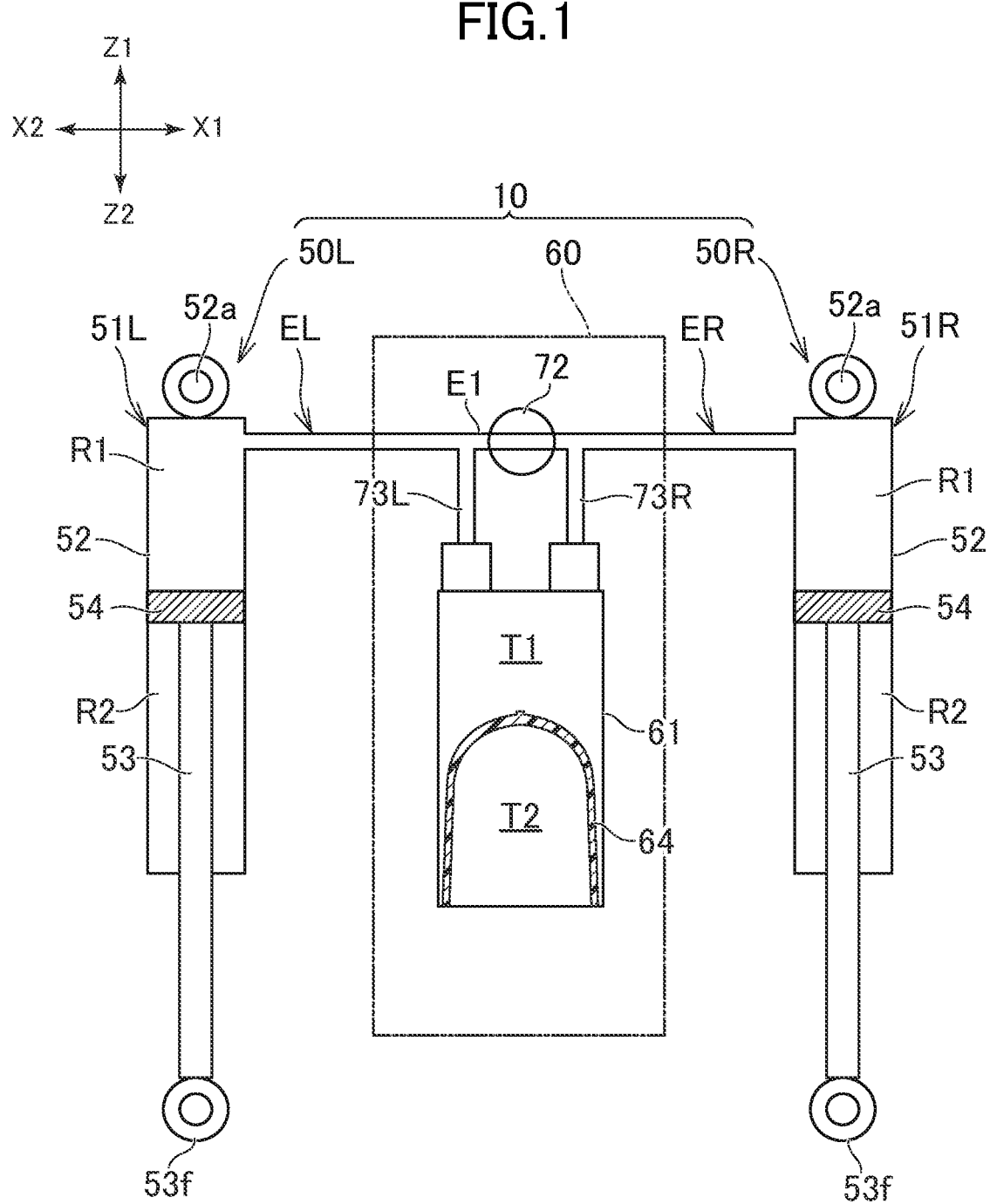
FIG. 1 is a schematic diagram illustrating an example of left and right dampers and an intermediate unit included in a suspension system proposed in the present disclosure.
Figure 4A:
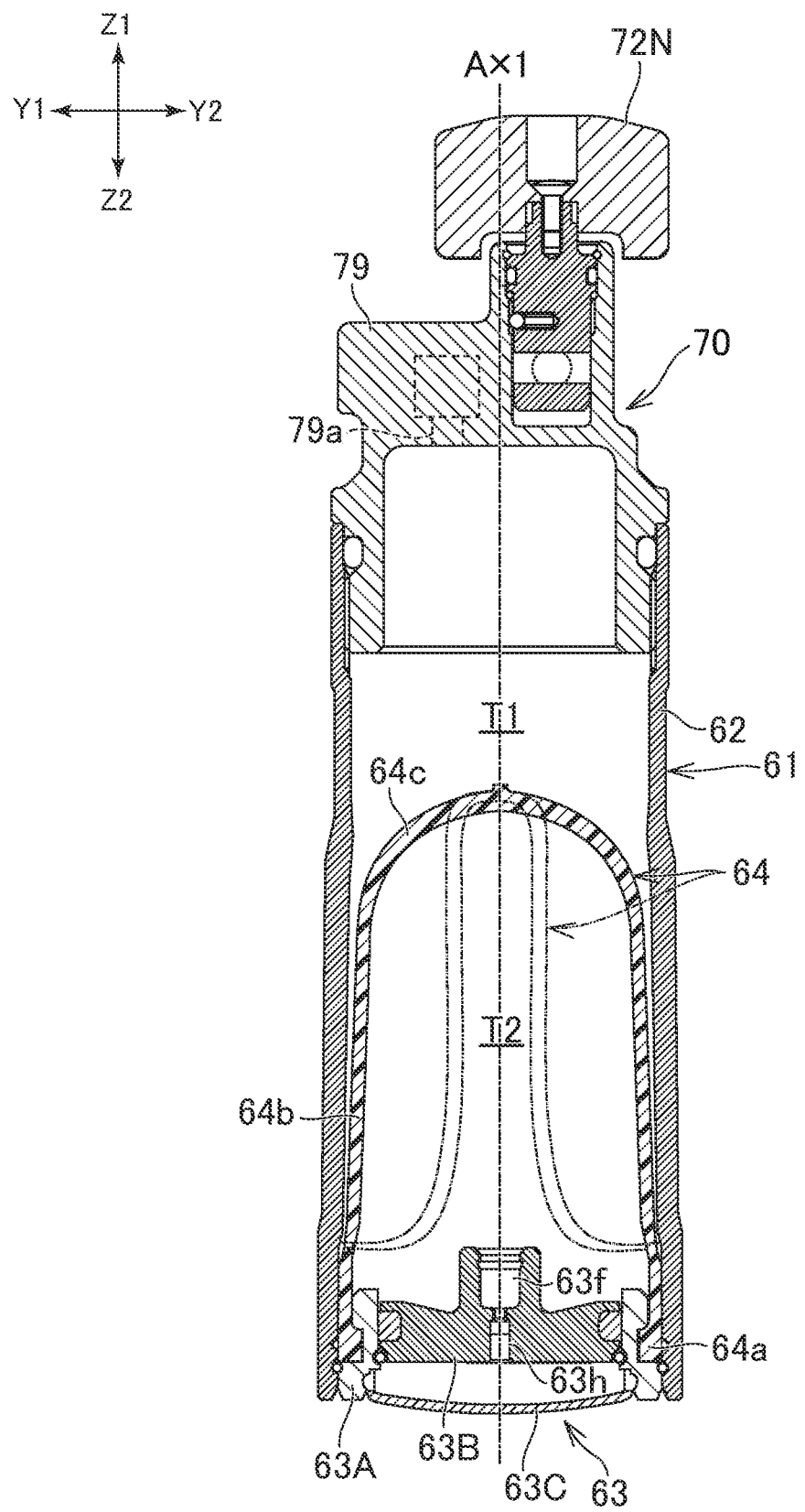
FIG. 4A is a cross-sectional view taken along the line IV-IV illustrated in FIG. 3A.

In the following description, directions indicated by X1 and X2 in FIG. 1 are referred to as right and left, respectively, and directions indicated by Z1 and Z2 in FIG. 1 are referred to as upper and lower, respectively. The directions indicated by Y1 and Y2 in FIG. 4A are referred to as front and rear, respectively.

(Damper)

As illustrated in FIG. 1, the suspension system 10 has two suspensions 50R and 50L. The suspensions 50R and 50L are respectively configured by dampers 51R and 51L and springs 59 (see FIG. 2). The suspension 50R is disposed, for example, in the right direction of a vehicle body and buffers up and down movement of a right ski or a right wheel (in this specification, a member which is in contact with a snow surface or a road surface and supports the vehicle body, such as a ski and a wheel, is referred to as a vehicle body support member). The suspension 50L is disposed, for example, in the left direction of the vehicle body and buffers up and down movement of the left vehicle body support member. In the following description, the damper 51R is referred to as the "right damper", and the damper 51L is referred to as the "left damper". When the suspension system 10 is mounted on a four-wheeled vehicle, one of the two suspensions may buffer the up and down movement of a front wheel and the other suspension may buffer the up and down movement of a rear wheel.

Figure 2:
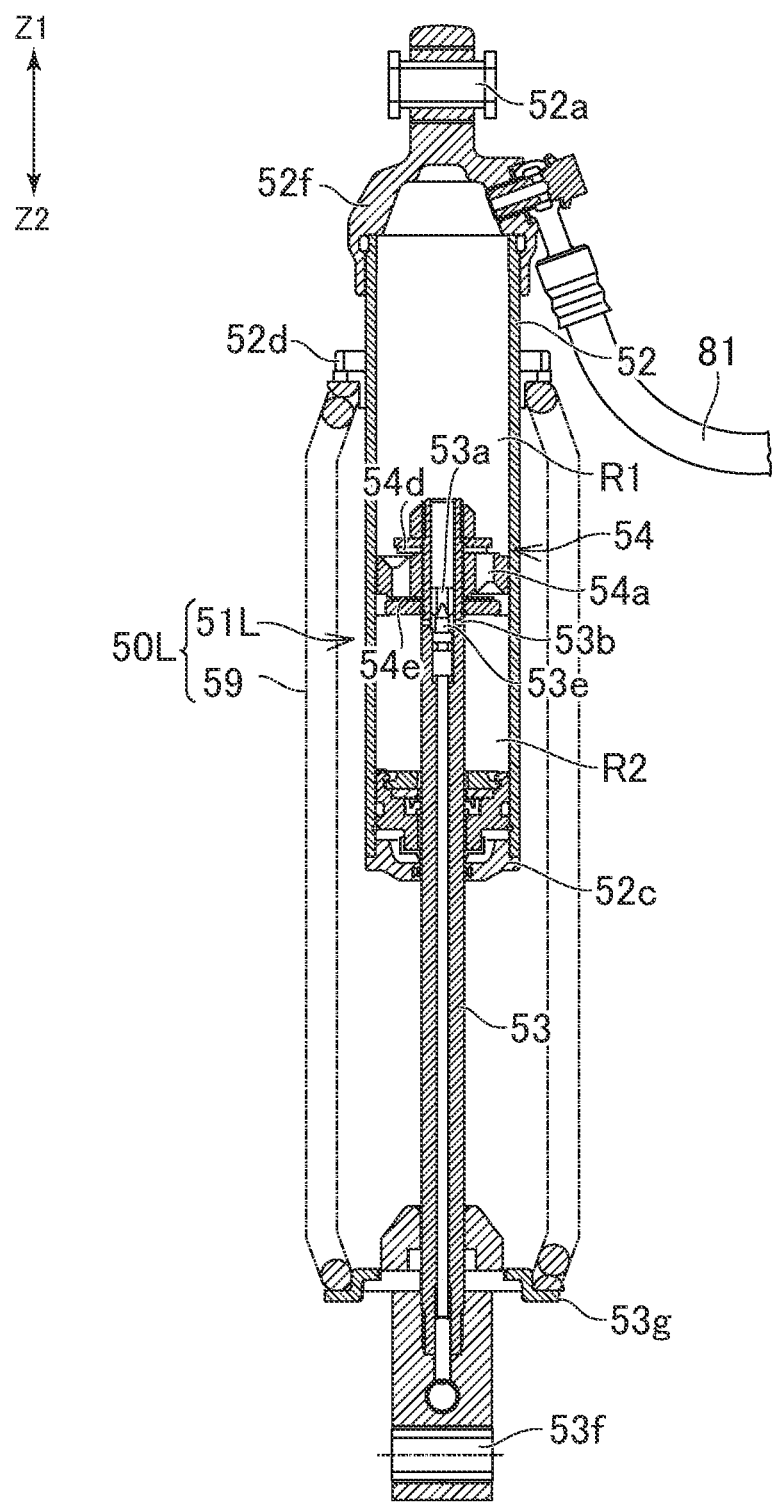
FIG. 2 is a cross-sectional view illustrating an example of a left suspension included in the suspension system.

As illustrated in FIG. 2, the left damper 51L includes a cylinder 52 and a piston rod 53. The cylinder 52 includes oil chambers R1 and R2 in which oil is filled. The piston rod 53 has, at its end, a piston 54 which partitions the oil chambers R1 and R2. The piston 54 and/or the piston rod 53 include a damping force generating mechanism which generates a damping force when they move relative to the cylinder 52. The right damper 51R has the same structure as the left damper 51L. That is, the right damper 51R also includes the cylinder 52, the piston rod 53, the piston 54, and the damping force generating mechanism. Hereinafter, an example of the structure of the dampers 51R and 51L will be described with reference to the left damper 51L illustrated in FIG. 2.

As illustrated in FIG. 2, as an example of the damping force generating mechanism, the piston 54 has flow paths 54a and 54b which allow oil to move between the first oil chamber R1 and the second oil chamber R2 and valve plates 54d and 54e which open or close the flow paths 54a and 54b. When the oil passes through the flow paths 54a and 54b, a damping force is generated.

As illustrated in FIG. 2, as an example of the damping force generating mechanism, the piston rod 53 may include flow paths 53a and 53b which allow movement of oil between the first oil chamber R1 and the second oil chamber R2 and a needle valve 53e which adjusts the degree of opening of the flow paths 53a and 53b. A damping force is also generated when the oil passes through the flow paths 53a and 53b. The needle valve 53e is movable along an axial direction of the cylinder 52. The needle valve 53e can move to a closed position in which the needle valve 53e is fitted to the flow path 53a to close the flow path 53a, an open position in which the needle valve 53e is away from the flow path 53a to open the flow path 53a, and a position between the closed position and the open position. The damper 51L has an operation unit (not illustrated) connected to the needle valve 53e. A user can adjust the position of the needle valve 53e (in other words, the degree of opening of the flow paths 53a and 53b) by operating the operation unit.

As illustrated in FIG. 2, the cylinder 52 has a cap 52c at its lower end for closing the cylinder 52. The piston rod 53 extends from the piston 54 through the second oil chamber R2 toward the cap 52c and protrudes from the cap 52c to the outside of the cylinder 52.

Vehicles such as snowmobiles and four-wheeled vehicles have arms which connect the vehicle body support member and the vehicle body frame so that the vehicle body support member (skis or wheels) can move up and down relative to the vehicle body frame. For example, an end portion (lower end) 53f of the piston rod 53 is connected to this arm and an end portion (upper end) 52a of the cylinder 52 is connected to the vehicle body frame. Therefore, the piston 54 and the piston rod 53 move relative to cylinder 52 in accordance with the up and down movement of the vehicle body support member.

As illustrated in FIG. 2, a spring sheet 52d is attached to an outer peripheral surface of the cylinder 52 and a spring sheet 53g is attached to an end portion of the piston rod 53. The spring 59 is held between the spring sheet 52d and the spring sheet 53g.

(Intermediate Unit and Oil Flow Path)

As illustrated in FIG. 1, the suspension system 10 includes an intermediate unit 60 arranged in oil flow paths ER and EL connecting the first oil chamber R1 of the right damper 51R and the first oil chamber R1 of the left damper 51L. The left oil flow path EL has a pipe 81 (see FIG. 2) extending from the left damper 51L. The right oil flow path ER has the pipe 81 extending from the right damper 51R. The two pipes 81 are connected to the intermediate unit 60.

The intermediate unit 60 includes an intermediate oil chamber T1 connected to the first oil chambers R1 of the dampers 51R and 51L and an intermediate case 61 having therein an intermediate gas chamber T2. The intermediate gas chamber T2 is filled with, for example, a gas such as nitrogen or air. The intermediate oil chamber T1 and the intermediate gas chamber T2 are partitioned by a diaphragm 64 (see FIG. 4A) described below. The intermediate oil chamber T1 is connected to the first oil chamber R1 of the right damper 51R via the oil flow path ER and is connected to the first oil chamber R1 of the left damper 51L via the oil flow path EL. (Hereinafter, the oil flow path ER is referred to as the "right oil flow path" and the oil flow path EL is referred to as the "left oil flow path"). The right oil flow path ER and the left oil flow path EL are shown by the pipes 81, and are (see FIGS. 2 and 3A) formed of rubber or resin, for example. A flow path to which the pipe 81 is connected is formed in a cap 52f (see FIG. 2) which closes the upper end of the cylinder 52.

For example, when the right vehicle body support member and the left vehicle body support member ride over a bump on a snow surface or a road surface, the two dampers 51R and 51L are simultaneously compressed, and thus the two dampers 51R and 51L move in the same direction. In this case, the oil moves from the first oil chambers R1 of the two dampers 51R and 51L to the intermediate oil chamber T1 through the oil flow paths ER and EL. As a result, the intermediate oil chamber T1 expands. For example, when the left damper 51L is compressed due to the vehicle turning right, the two dampers 51R and 51L move in opposite directions. In this case, oil moves from the left damper 51L to the intermediate oil chamber T1 and oil moves from the intermediate oil chamber T1 to the right damper 51R. As a result, the right damper 51R is extended and the contact pressure between the right vehicle body support member and the snow or road surface is secured.

(Diaphragm)

As illustrated in FIG. 4A, the intermediate oil chamber T1 and the intermediate gas chamber T2 are arranged in a direction along an axis (the axis of a cylindrical main body 62 described below) Ax1 of the intermediate case 61. In the exampled intermediate unit 60, the intermediate gas chamber T2 is formed below the intermediate oil chamber T1. Conversely, the intermediate oil chamber T1 may be formed below the intermediate gas chamber T2. The intermediate gas chamber T2 is partitioned from the intermediate oil chamber T1 by the diaphragm 64.

The position of an outer peripheral edge 64a of the diaphragm 64 is fixed to the intermediate case 61. The diaphragm 64 is formed of a flexible material. The term "flexible" means that the material can be curved or bent. The diaphragm 64 may be stretchable or elastic owing to the flexibility. The material of the diaphragm 64 is, for example, rubber. The diaphragm 64 may be formed of a resin which can be recessed, that is, has flexibility. When the oil flows into the intermediate oil chamber T1 from the dampers 51R and 51L, the diaphragm 64 is deformed, specifically, the diaphragm 64 is recessed (see the diaphragm 64 illustrated by a two-dot chain line in FIG. 4A), and thus the intermediate oil chamber T1 expands and the intermediate gas chamber T2 contracts. Conversely, when oil flows out from the intermediate oil chamber T1 to the oil chambers R1 of the dampers 51R and 51L, the diaphragm 64 is deformed, and specifically, the diaphragm 64 is bulged to its original shape, and thus the intermediate oil chamber T1 contracts and the intermediate gas chamber T2 expands.

In the structure in which the intermediate gas chamber T2 and the intermediate oil chamber T1 are partitioned by a free piston movable in the intermediate case, instead of the flexible diaphragm 64, when the free piston moves in the intermediate case 61, a small amount of friction occurs between the free piston and the inner surface of the intermediate case 61. On the other hand, in the structure proposed in the present disclosure, since the intermediate gas chamber T2 and the intermediate oil chamber T1 are partitioned by the flexible diaphragm 64, that friction does not occur. Therefore, the capacity change of the intermediate oil chamber T1 and the intermediate gas chamber T2 is made smoother than in the structure having the free piston, and thus the responsiveness of the suspension system 10 can be improved.

As illustrated in FIG. 4A, the diaphragm 64 bulges from the outer peripheral edge (lower edge) 64a toward the intermediate oil chamber T1. The diaphragm 64 is bulged in a direction (upward in the example described here) along the axis Ax1 of the intermediate case 61 and has a bag shape having the intermediate gas chamber T2 inside. The diaphragm 64 includes a body portion 64b of a cylindrical shape and a top portion 64c of a hemispherical shape located at an end portion of the body portion 64b. According to this shape of the diaphragm 64, when the oil flows into the intermediate oil chamber T1, for example, the body portion 64b is recessed (see the diagram 64 illustrated by a two-dot chain line in FIG. 4A). Therefore, the expansion of the intermediate oil chamber T1 and the contraction of the intermediate gas chamber T2 can be smoothly generated.

(Mounting Structure of Diaphragm)

As illustrated in FIG. 4A, the intermediate case 61 includes the cylindrical main body 62 having an open lower end portion and a lid member 63 for closing the lower end portion. The cylindrical main body 62 may have a cylindrical shape having a circular or elliptical cross section or a cylindrical shape having a square cross section. The inner surface of the lid member 63 faces the intermediate gas chamber T2 and the intermediate gas chamber T2 is sealed by the lid member 63 and the diaphragm 64. The lid member 63 includes an annular or cylindrical lid outer peripheral portion 63A and a lid central portion 63B fitted inside the lid outer peripheral portion 63A. According to this structure, for example, the capacity of the intermediate gas chamber T2 can be adjusted by moving the lid central portion 63B in the direction along the axis Ax1 with respect to the lid outer peripheral portion 63A. The movement of the lid central portion 63B can be performed by inserting a tool into a gas pressure adjusting hole 63h formed in the lid central portion 63B. The intermediate case 61 may not have such a gas volume adjusting mechanism. In this case, the material of the lid outer peripheral portion 63A and the material of the lid central portion 63B may be different from each other or may be the same.

As illustrated in FIG. 4A, the outer peripheral edge 64a of the diaphragm 64 is fixed to the intermediate case 61 by being interposed between the lid member 63 and the cylindrical main body 62. The outer peripheral edge 64a of the diaphragm 64 is pressed by the lid member 63 (more specifically, the lid outer peripheral portion 63A) and is in close contact with the cylindrical main body 62. With this structure, the work of attaching the diaphragm 64 can be simplified and the sealing of the intermediate gas chamber T2 and the intermediate oil chamber T1 can be ensured.

The lid member 63 is fitted inside the cylindrical main body 62. The outer peripheral edge 64a of the diaphragm 64 is interposed between the outer peripheral surface of the lid member 63 and the inner surface of the cylindrical main body 62. More specifically, the outer peripheral edge 64a of the diaphragm 64 is interposed between the outer peripheral surface of the lid outer peripheral portion 63A and the inner surface of the cylindrical main body 62.

Figure 4B:
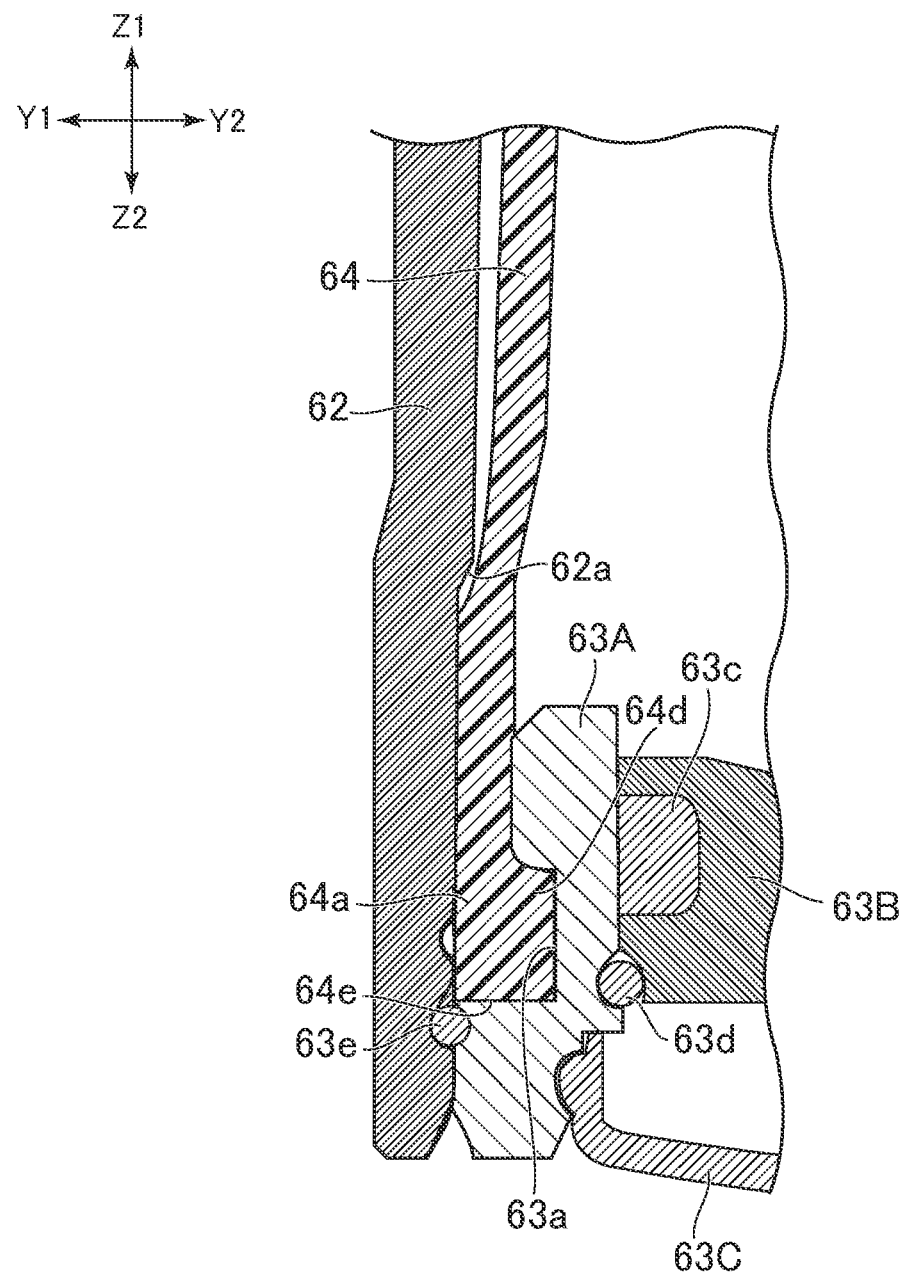
FIG. 4B is an enlarged view of a part of FIG. 4A.

The outer peripheral edge 64a of the diaphragm 64 may be hooked on the outer peripheral surface of the lid member 63. Specifically, as illustrated in FIG. 4B, the outer peripheral edge 64a may have an engaging portion 64d. The engaging portion 64d is a convex portion protruding toward the inside of the cylindrical main body 62. An engaged portion 63a, which is a groove extending in the circumferential direction, is formed on the outer peripheral surface of the lid outer peripheral portion 63A. The engaging portion 64d is hooked on the engaged portion 63a. Contrary to the example in the intermediate unit 60, a groove extending in the circumferential direction may be formed as an engaging portion on the inner surface of the outer peripheral edge 64a of the diaphragm 64 and a convex portion fitted into this groove may be formed as an engaged portion on the outer peripheral surface of the lid outer peripheral portion 63A.

As illustrated in FIG. 4B, an annular stopper member 63e which defines the position of the lid outer peripheral portion 63A may be attached to the inner surface of the cylindrical main body 62. The stopper member 63e is located below (outer side in the direction along the axis Ax1) the lid outer peripheral portion 63A and is held by a groove formed on the inner surface of the cylindrical main body 62. The downward movement (outward movement in the direction along the axis Ax1) of the lid outer peripheral portion 63A may be regulated by the stopper member 63e and the position of the lid outer peripheral portion 63A may be fixed by the stopper member 63e.

According to this structure, the work of attaching the diaphragm 64 to the intermediate case 61 can be further simplified. For example, in the work of attaching the diaphragm 64, the outer peripheral edge 64a of the diaphragm 64 is hooked on the outer peripheral surface of the lid outer peripheral portion 63A, and then the lid outer peripheral portion 63A is fitted inside the cylindrical main body 62. Then, the stopper member 63e is attached to the inner surface of the cylindrical main body 62. Next, when the lid outer peripheral portion 63A is lowered, the lid outer peripheral portion 63A is caught by the stopper member 63e and the position of the lid outer peripheral portion 63A is fixed together with the diaphragm 64. Finally, the lid central portion 63B is fitted inside the lid outer peripheral portion 63A. As a result, the lid outer peripheral portion 63A is pressed against the inner surface of the cylindrical main body 62 together with the outer peripheral edge 64a of the diaphragm 64. An annular stopper member 63d is fitted on the inner surface of the lid outer peripheral portion 63A. A groove is formed on the inner surface of the lid outer peripheral portion 63A and the stopper member 63d is arranged in this groove. The position of the lid central portion 63B is defined by the stopper member 63d.

As illustrated in FIG. 4B, a step 62a bulging inward is formed on the inner surface of the cylindrical main body 62. When the lid outer peripheral portion 63A is fitted inside the cylindrical main body 62 in the work of attaching the diaphragm 64 and the lid outer peripheral portion 63A, the step 62a functions as a stopper which prevents the lid outer peripheral portion 63A from excessively entering inside the cylindrical main body 62.

As illustrated in FIG. 4B, the position of the lid central portion 63B is higher than an end portion (lower end) 64e of the diaphragm 64. That is, the position of the lid central portion 63B is closer to the center of the cylindrical main body 62 in the direction along the axis Ax1 than the position of the end portion 64e of the diaphragm 64.

An annular sealing member 63c is provided between the inner surface of the lid outer peripheral portion 63A and the outer peripheral surface of the lid central portion 63B. In the examined intermediate unit 60, the position of the sealing member 63c attached to the outer peripheral surface of the lid central portion 63B is also higher than that of the end portion (lower end) 64e of the diaphragm 64. Therefore, the sealing member 63c is located radially inward of the outer peripheral edge 64a of the diaphragm 64.

As illustrated in FIG. 4A, the gas pressure adjusting hole 63h is formed in the lid central portion 63B, which allows gas to be injected into the intermediate gas chamber T2 and allows discharge of gas from the intermediate gas chamber T2. The gas pressure adjusting hole 63h has a valve 63f, which is, for example, a rubber valve. By inserting a gas injection needle into the gas pressure adjusting hole 63h and a hole formed in the rubber valve, gas injection and gas discharge can be performed. The lid member 63 may have a cover 63C which covers the gas pressure adjusting hole 63h.

The structure of the intermediate case 61 is not limited to the example described here. For example, the lid outer peripheral portion 63A and the lid central portion 63B may be formed integrally. That is, the lid outer peripheral portion 63A and the lid central portion 63B may be one member integrally formed of metal or resin. Further, a screw and a screw groove are formed on the outer peripheral surface of the lid outer peripheral portion 63A and the inner surface of the cylindrical main body 62, respectively, and the screw and the screw groove may allow the lid outer peripheral portion 63A to be fixed to the cylindrical main body 62. Also, in this case, the outer peripheral edge 64a of the diaphragm 64 may be attached to the outer peripheral surface of the cylindrical main body 62. In this case, the stopper member 63e may not be used for attaching the lid outer peripheral portion 63A to the cylindrical main body 62.

(Size of Diaphragm)

When the left and right dampers 51R and 51L are compressed, the piston rod 53 enters the cylinder 52. When the right damper 51R is in the most compressed state (minimum length), a part of the piston rod 53 is located within the second oil chamber R2 (see FIG. 2). The volume of the part of the piston rod 53 is defined as "V1". Similarly, when the left damper 51L is in the most compressed state (minimum length), a part of the piston rod 53 is located within the second oil chamber R2. The volume of the part of the piston rod 53 is defined as "V2". When V1 and V2 are defined in this way, the capacity of the intermediate gas chamber T2, when the left and right dampers 51R and 51L are in the most extended state (maximum length), is larger than V1+V2. Because the capacity of the intermediate gas chamber T2 has such a large value, the movement of the piston 54 can be smoothed. In the examined intermediate unit 60, the volume of the diaphragm 64, which formed in a bag shape as described above, is greater than V1+V2. The volume of diaphragm 64 may be greater than twice V1+V2.

In the above description, the "most compressed state of the dampers 51R and 51L" means a state where the piston 54 or a member thereof which moves integrally with the piston 54 collides with any part of the cylinder 52 and thus the movement of the piston 54 in a compression direction is restricted. The most compressed state of the dampers 51R and 51L is, for example, a state in which the spring sheet 53g hits the cap 52c of the cylinder 52. On the other hand, the "most extended state of the dampers 51R and 51L" means a state where the piston 54, or a member which moves integrally with the piston 54, collides with any part of the cylinder 52 and the movement of the piston 54 in an extension direction is restricted. For example, the most extended state of the dampers 51R and 51L is a state where the piston 54 collides with the lower end of the cylinder 52.

As described above, when oil flows into the intermediate oil chamber T1 from the left and right dampers 51R and 51L, as illustrated by the two-dot chain line in FIG. 4A, the diaphragm 64 is bent (recessed). Therefore, the intermediate oil chamber T1 expands and the intermediate gas chamber T2 contracts. The diaphragm 64 has a sufficient area so that such deflection occurs. Specifically, the surface area of the diaphragm 64 is larger than the sum of the cross-sectional areas inside the cylinders 52 of the left and right dampers 51R and 51L. The cross-sectional area means an internal size of the cylinders 52 in the cross-section thereof taken along a plane vertical to the axial direction of the cylinder 52. The surface area of the diaphragm 64 is the sum of the surface area of the cylindrical body portion 64b and the surface area of the hemispherical top portion 64c. The area of the body portion 64b may be larger than the sum of the cross-sectional areas inside the cylinders 52 of the left and right dampers 51R and 51L. The area of the diaphragm 64 may be larger than twice the sum of the cross-sectional areas inside the cylinders 52 of the left and right dampers 51R and 51L.

The size (length L2, see FIG. 4A) of the diaphragm 64 in the direction along the axis Ax1 is larger than half the size (length L1, see FIG. 4A) of the cylindrical main body 62 in the same direction. This facilitates securing the surface area of the diaphragm 64. In the exampled intermediate unit 60, the diameter of the inner surface of the cylindrical main body 62 is larger than the diameter of the inner surface of the cylinder 52 of the damper 51R or 51L. This also facilitates securing the surface area of the diaphragm 64.

(Position of Diaphragm)

Figure 3A:
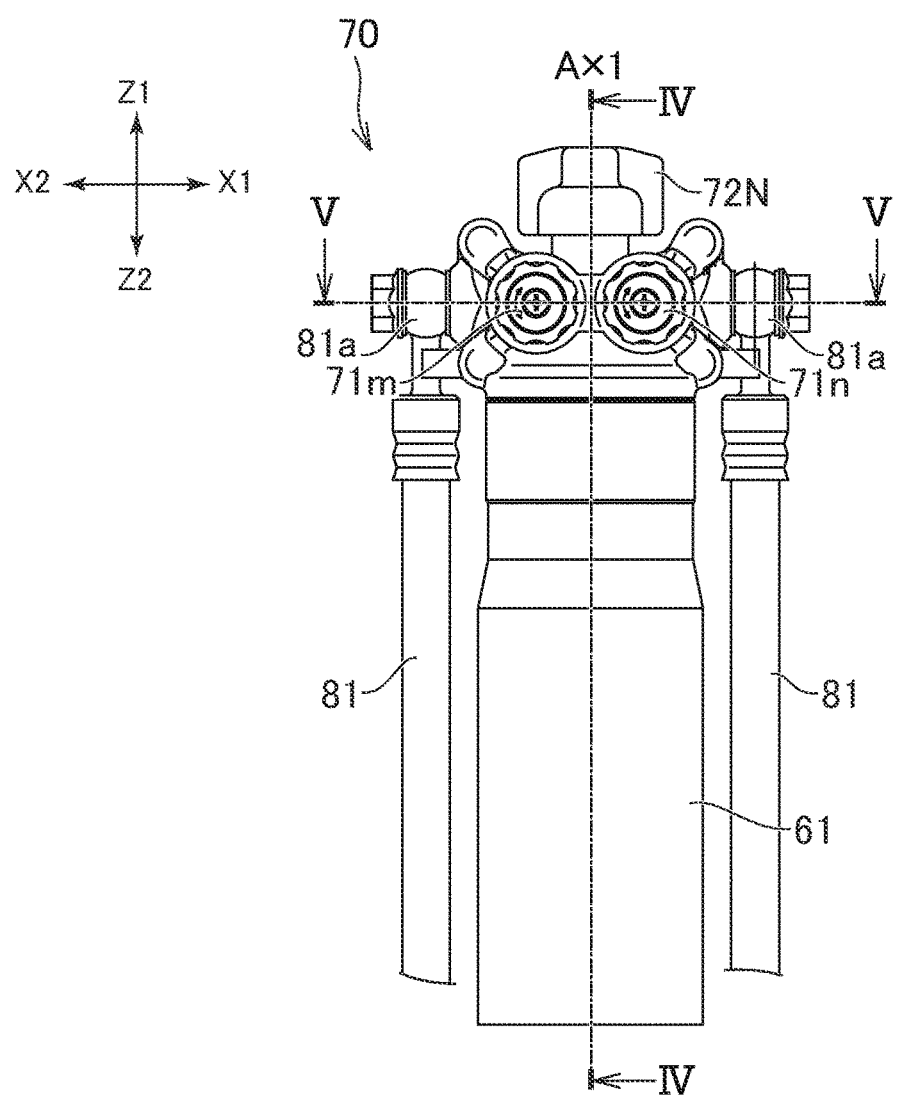
FIG. 3A is a front view illustrating an example of the intermediate unit.
Figure 5:
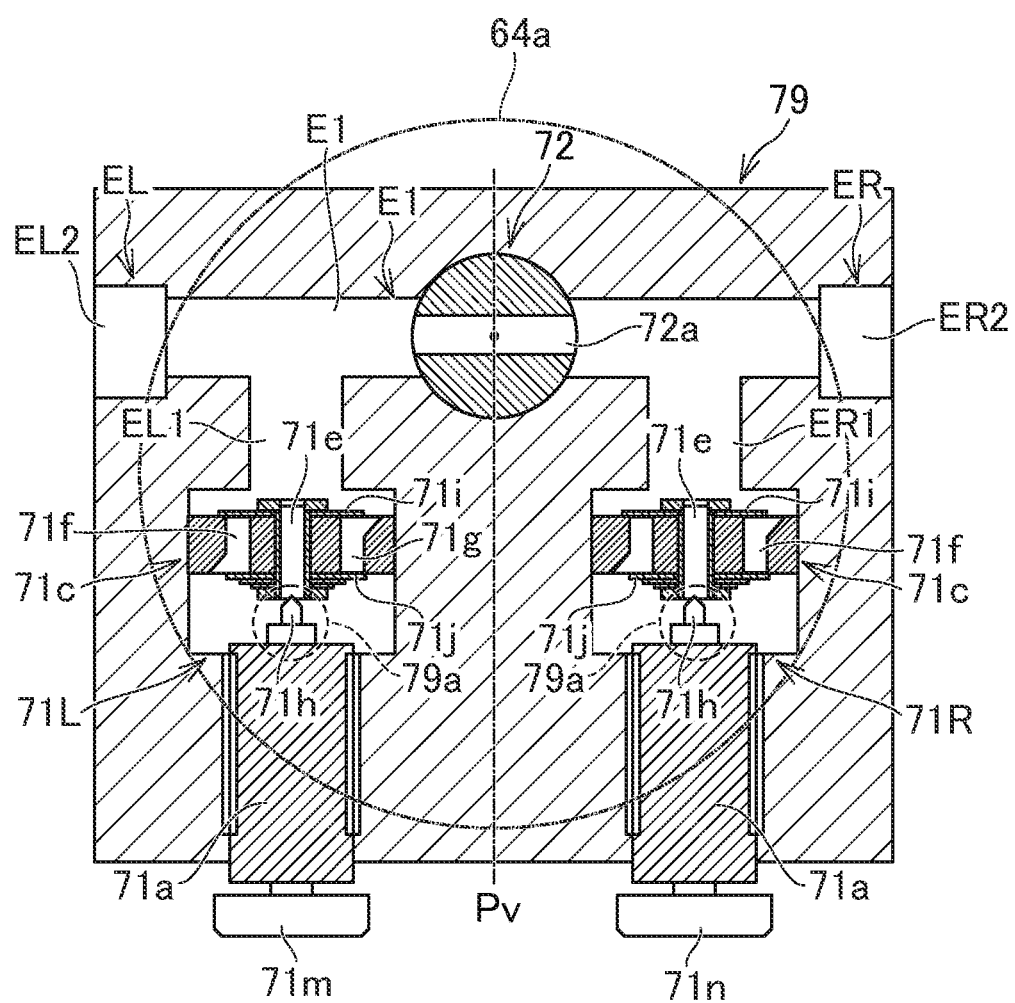
FIG. 5 is a cross-sectional view taken along the line V-V illustrated in FIG. 3A.

The intermediate unit 60 has a valve assembly 70 (see FIG. 3A). The valve assembly 70 is attached to an upper end portion (end portion opposite to the lid member 63) of the cylindrical main body 62 and closes the cylindrical main body 62. As illustrated in FIG. 5, the valve assembly 70 includes a damping force generating mechanism 71R located on the way of an oil flow path ER1 connecting the cylinder 52 of the right damper 51R and the intermediate oil chamber T1 and a damping force generating mechanism 71L located on the way of an oil flow path EL1 connecting the cylinder 52 of the left damper 51L and the intermediate oil chamber T1. A housing 79 of the valve assembly 70 is formed with a flow path 79a (see FIG. 4A) connecting the right damping force generating mechanism 71R and the intermediate oil chamber T1 and the flow path 79a connecting the left damping force generating mechanism 71L and the intermediate oil chamber T1. The flow path 79a extends in a direction (up-down direction) along the axis Ax1. The valve assembly 70 has a switching valve 72. Details of the damping force generating mechanisms 71R and 71L and the switching valve 72 will be described below.

The damping force generating mechanisms 71R and 71L are located in a direction (more specifically, upward direction) along the axis Ax1 with respect to the diaphragm 64. The diaphragm 64 has a bag shape which bulges from the outer peripheral edge 64a toward the damping force generating mechanisms 71R and 71L. As illustrated in FIG. 5, when the intermediate unit 60 is viewed in the direction along the axis Ax1, the two flow paths 79a (see FIGS. 4A and 5) connecting the damping force generating mechanisms 71R and 71L and the intermediate oil chamber T1 are located inside the outer peripheral edge 64a of the diaphragm 64. When the intermediate unit 60 is viewed in the direction along the axis Ax1, flow path members 71c of the damping force generating mechanisms 71R and 71L are located inside the outer peripheral edge 64a of the diaphragm 64. Further, when the intermediate unit 60 is viewed in the direction along the axis Ax1, the switching valve 72 is also located inside the outer peripheral edge 64a of the diaphragm 64. As described above, the plurality of damping force generating mechanisms 71R and 71L and the valve 72 are arranged in a small area, and thus the size of the intermediate unit 60 is reduced.

As illustrated in FIG. 5, when the intermediate unit 60 is viewed in the direction along the axis Ax1, the damping force generating mechanisms 71R and 71L are arranged at positions symmetrical with respect to a vertical plane Pv passing through the center of the diaphragm 64. Therefore, the flow paths 79a connecting the damping force generating mechanisms 71R and 71L and the intermediate oil chamber T1 are also formed at positions symmetrical with respect to the vertical plane Pv.

(Operation of Diaphragm)

Figure 6B:
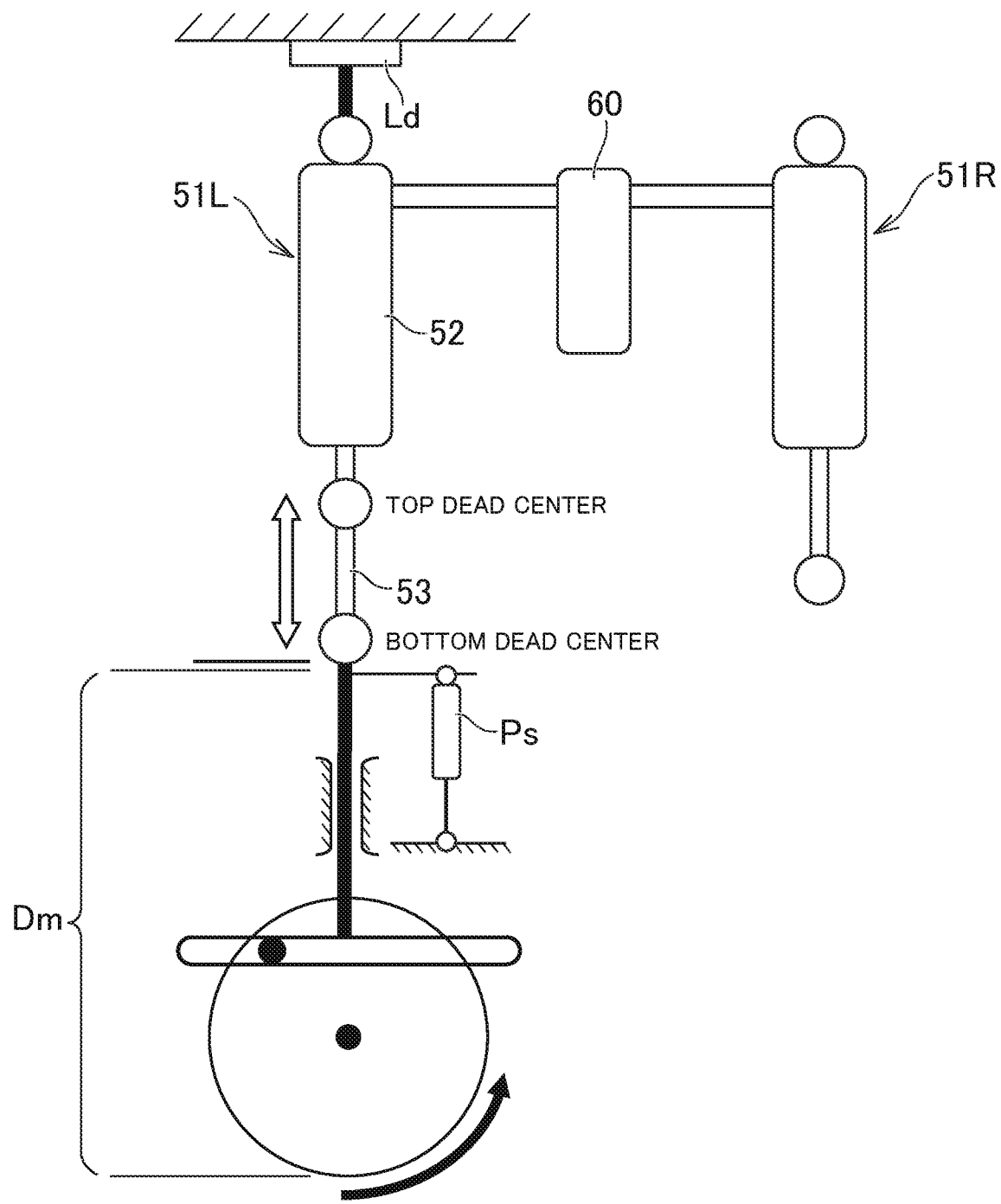
FIG. 6B is a diagram schematically illustrating a damping force tester for measuring a relationship between a speed and a force of a piston rod illustrated in FIG. 6A.

FIG. 6A is a graph illustrating a damping force characteristic diagram for explaining the responsiveness of the suspension system 10. FIG. 6B is a schematic diagram illustrating a damping force tester for measuring a relationship between a speed and a force of a piston rod illustrated in FIG. 6A.

As illustrated in FIG. 6B, the lower end of the piston rod 53 of one of the right and left dampers 51R and 51L is fixed to a drive mechanism Dm and the piston rod 53 is moved up and down by the drive mechanism Dm. For example, the left damper 51L is connected to the driving mechanism Dm. The upper end of the cylinder 52 of the left damper 51L is attached to a load sensor Ld. The resistance (that is, the damping force) generated by the left damper 51 is measured based on the output of the load sensor Ld. The piston rod 53 of the left damper 51L is connected to a position sensor Ps. The speed of the piston rod 53 is calculated based on the output of the position sensor Ps. As the position sensor Ps, for example, a linear variable operation transformer can be used. The other damper (the right damper 51R in FIG. 6B) is arranged so that the piston rod 53 can be freely displaced.

In FIG. 6A, the horizontal axis is the speed (that is, the speed of the piston 54) of the piston rod 53 calculated based on the output of the position sensor Ps and the vertical axis is the force (that is, the damping force exerted by the damper) calculated from the output of the load sensor Ld. In these figures, each quadrant represents the following state.

(First quadrant) Speed: Speed at rebound (extension), Force: Damping force in the direction opposing rebound;
(Second quadrant) Speed: Speed at bump (compression), Force: Damping force in the direction opposing rebound;
(Third quadrant) Speed: Speed at bump, Force: Damping force in the direction opposing bump;
(Fourth quadrant) Speed: Speed at rebound, Force: Damping force in the direction opposing bump.

In FIG. 6, a point P1 corresponds to the top dead center of the piston rod 53 and a point P2 corresponds to the bottom dead center of the piston rod 53.

As illustrated in FIG. 6A, the direction of the force generated by the damper 51 is reversed slightly after the piston rod 53 reaches the top dead center P1. In the illustrated example, when the speed of the piston rod 53 reaches S1, the direction of the force generated by the damper 51 is reversed. The direction of the force generated by the damper 51 is reversed slightly after the piston rod 53 reaches the bottom dead center P2. In the illustrated example, when the speed of the piston rod 53 reaches S2, the direction of the force generated by the damper 51 is reversed. No friction occurs when the diaphragm 64 moves. Therefore, the responsiveness of the suspension system 10 can be improved as compared with the suspension system in which the intermediate oil chamber T1 and the intermediate gas chamber T2 are partitioned by a free piston instead of the diaphragm 64. That is, the speeds S1 and S2 approach 0.

Figure 7A:
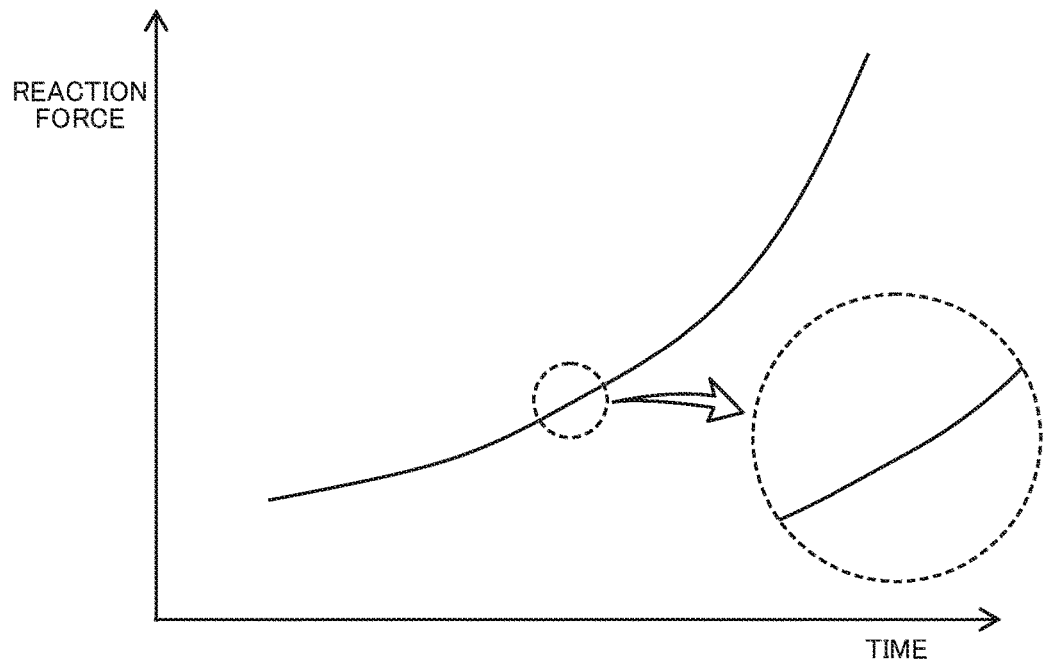
FIG. 7A is a diagram illustrating a change with time of a reaction force of the damper in the suspension system proposed in the present disclosure.
Figure 7B:
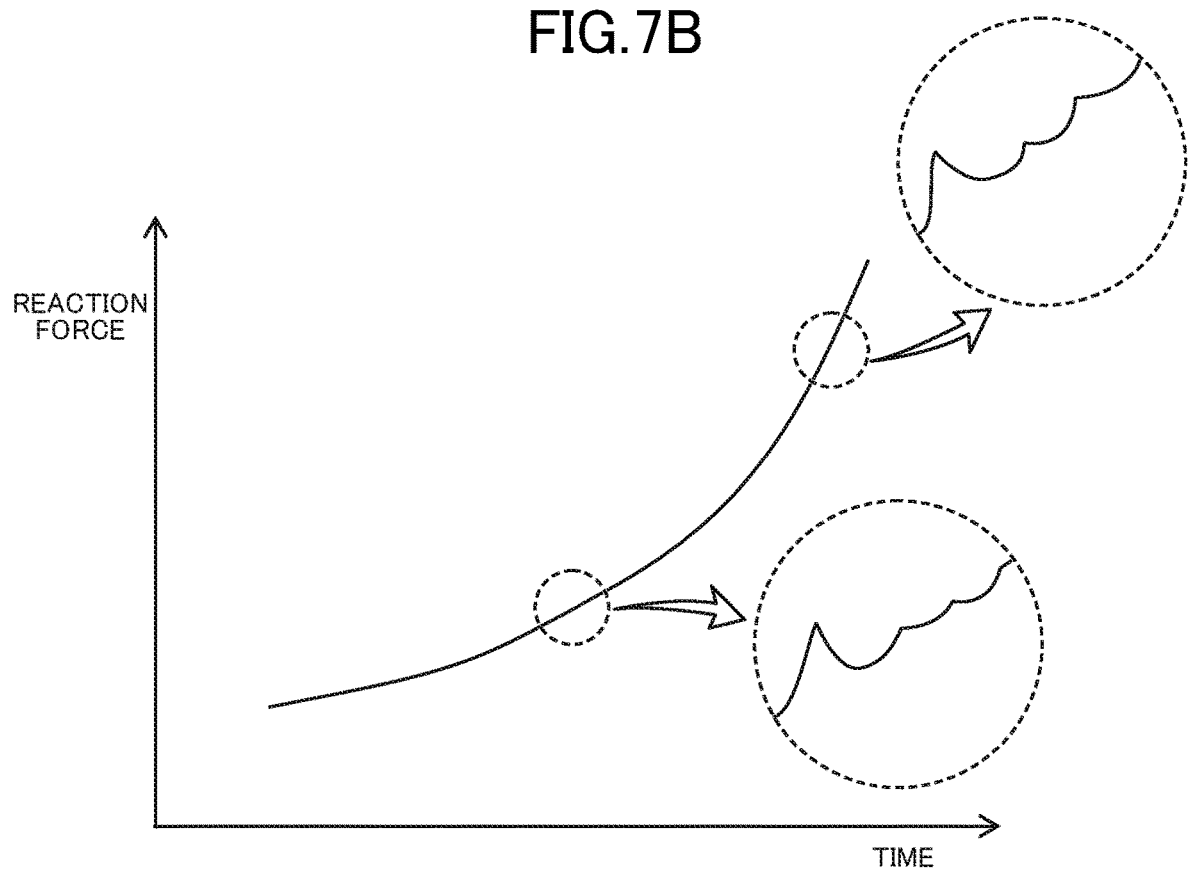
FIG. 7B is a diagram illustrating a change with time of the reaction force of the damper in the suspension system in which the gas chamber and the oil chamber of the intermediate unit are partitioned by a free piston instead of a diaphragm.

FIG. 7A is a schematic diagram illustrating a change with time of a reaction force acting on the piston rod 53 due to the compression of the intermediate gas chamber T2 in the suspension system 10. FIG. 7B is a schematic diagram illustrating a change of time of the reaction force acting on the piston rod 53 due to the compression of the intermediate gas chamber T2 in the suspension system in which the intermediate oil chamber T1 and the intermediate gas chamber T2 are partitioned by a free piston instead of the diaphragm 64. In the suspension system in which the intermediate oil chamber T1 and the intermediate gas chamber T2 are partitioned by the free piston, a small amount of friction may occur between the free piston and the inner surface of the intermediate case 61. Therefore, as illustrated in FIG. 7B, even when the reaction force gradually increases, the reaction force changes stepwise in a very short period. It is estimated that the state where the free piston does not move due to friction occurs several times in one stroke. On the other hand, in the suspension system 10 having the flexible diaphragm 64, there is no such friction, so that the reaction force changes smoothly as illustrated in FIG. 7A.

Figure 8A:
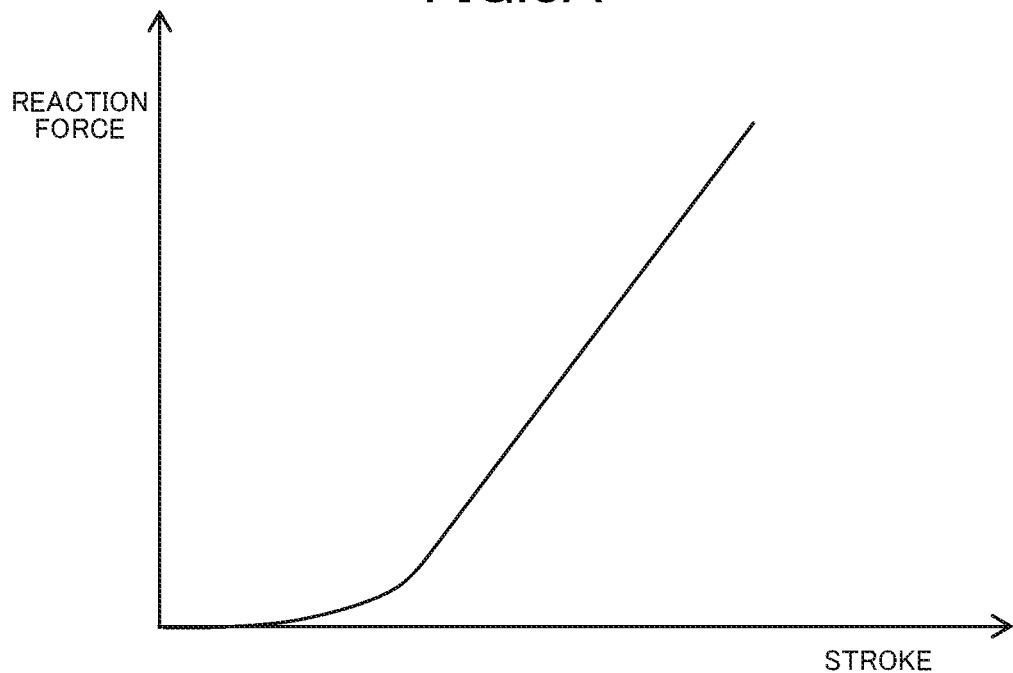
FIG. 8A is a diagram illustrating a relationship between a stroke of the piston rod and the reaction force of the damper in the suspension system proposed in the present disclosure.
Figure 8B:
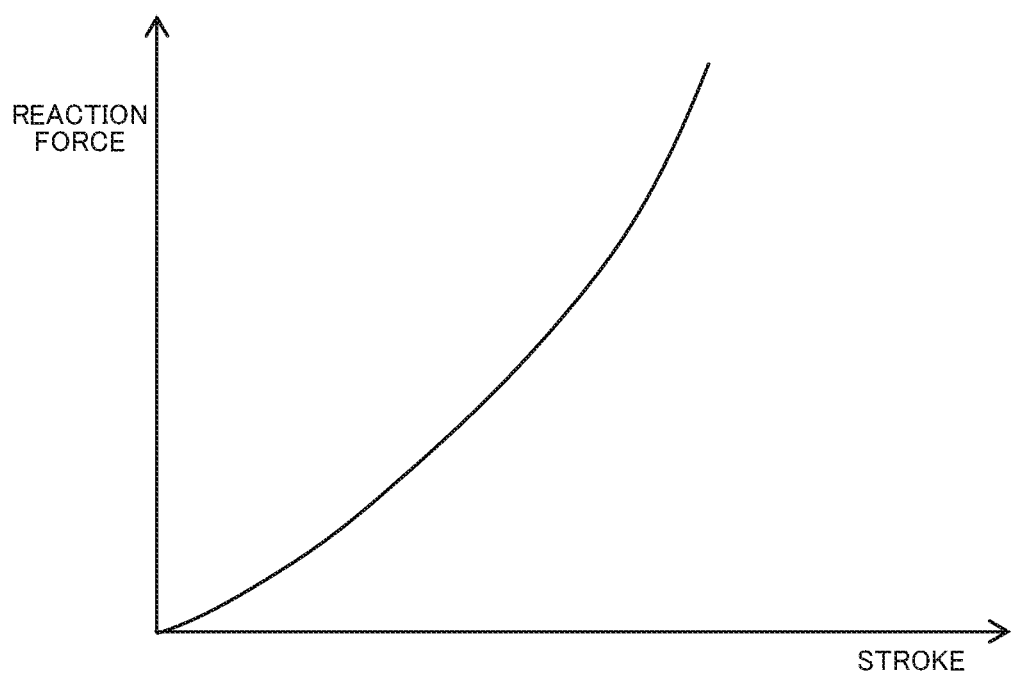
FIG. 8B is a diagram illustrating a relationship between the stroke of the piston rod and the reaction force of the damper in the suspension system in which the gas chamber and the oil chamber of the intermediate unit are partitioned by the free piston instead of the diaphragm.

When the dampers 51R and 51L are compressed, the piston rod 53 enters the cylinder 52, so that the oil moves to the intermediate oil chamber T1 and the intermediate gas chamber T2 is compressed. FIG. 8A is a diagram schematically illustrating the relationship between the stroke (displacement in the compression direction) of the piston rod 53 and the reaction force acting on the piston rod 53 due to the compression of the intermediate gas chamber T2 in the suspension system 10. FIG. 8B is a diagram schematically illustrating the relationship between the stroke of the piston rod 53 and the reaction force acting on the piston rod 53 due to compression of the intermediate gas chamber T2 in the suspension system in which the intermediate oil chamber T1 and the intermediate gas chamber T2 are partitioned by a free piston instead of the diaphragm 64.

As illustrated in FIG. 8B, in a suspension system using a free piston, the pressure of the intermediate gas chamber T2 increases as the stroke of the piston rod 53 increases, so that the reaction force acting on the piston rod 53 gradually increases.

On the other hand, since the diaphragm 64 of the suspension system 10 is made of rubber, the thickness of the diaphragm 64 decreases as the pressure acting on the diaphragm 64 increases. Therefore, even when the stroke of the piston rod 53 increases from 0 and the pressure of the intermediate oil chamber T1 increases, the thickness of the diaphragm 64 decreases, so that compression of the intermediate gas chamber T2 hardly occurs. Therefore, as illustrated in FIG. 8A, in a range where the stroke of the piston rod 53 is small, the increase in the reaction force acting on the piston rod 53 is slow. Then, when the stroke of the piston rod 53 further increases, the pressure of the intermediate oil chamber T1 increases, and accordingly, the reaction force acting on the piston rod 53 also increases. However, since the pressure rise in the intermediate oil chamber T1 is partially absorbed by the decrease in the thickness of the diaphragm 64, the increase in the reaction force acting on the piston rod 53 is slower than that in the suspension system using a free piston. Since the diaphragm 64 has a bag shape and the area of the diaphragm 64 is larger than the area (the cross-sectional area of the intermediate case 61) of the free piston, the influence of the decrease in the thickness of the diaphragm 64 is large.

(Damping Force Generating Mechanism)

As illustrated in FIG. 5, the damping force generating mechanism 71R is located on the way of the right oil flow path ER and generates resistance to oil movement between the right damper 51R and the intermediate oil chamber T1. The damping force generating mechanism 71L is located on the way of the left oil flow path EL and generates resistance to oil movement between the left damper 51L and the intermediate oil chamber T1. The resistance due to the damping force generating mechanisms 71R and 71L becomes a damping force with respect to the up and down movement of the vehicle body supporting members such as skis and wheels.

As illustrated in FIG. 5, the damping force generating mechanisms 71R and 71L are held by, for example, the housing 79. In the housing 79, the flow paths ER1 and EL1 from connection ports ER2 and EL2 to the damping force generating mechanisms 71R and 71L are formed. Nipples 81a (see FIG. 3A) provided at the end portions of the pipe 81 are connected to the connection ports ER2 and EL2.

As illustrated in FIG. 5, each of the damping force generating mechanisms 71R and 71L has a first flow path 71e and a flow path member 71c in which a plurality of second flow paths 71f are formed. An oil chamber connected to the intermediate oil chamber T1 is formed in the housing 79. The flow path member 71c is arranged in the oil chamber. Each of the damping force generating mechanisms 71R and 71L has a rotatable movable portion 71a. The movable portion 71a has a needle valve 71h which can be inserted into the first flow path 71e. The degree of opening of the first flow path 71e is determined according to the rotational position of the movable portion 71a. Outside the valve assembly 70, valve operation portions 71m and 71n for operating the movable portions 71a are attached. A user can respectively adjust the degree of opening of the first flow paths 71e by operating the valve operation portions 71m and 71n. In the second flow path 71f of the flow path member 71c, valve plates 71i and 71j for limiting the amount of oil flowing through the second flow path 71f are provided.

The structure of the damping force generating mechanisms 71R and 71L is not limited to the example described here. For example, the damping force generating mechanisms 71R and 71L may not be provided with the needle valve 71h or the valve plates 71i and 71j. In this case, a small hole (orifice) for generating a damping force may be formed in the flow path member 71c.

(Bypass Flow Path and Switching Valve)

The suspension system 10 may have a bypass flow path E1 (see FIG. 1) which connects the right oil flow path ER and the left oil flow path EL. The bypass flow path E1 connects the right oil flow path ER and the left oil flow path EL without passing through the intermediate oil chamber T1 and the damping force generating mechanisms 71R and 71L. The bypass flow path E1 is formed in the housing 79 and connects the right and left flow paths ER1 and EL1 (see FIG. 5) also formed in the housing 79.

As illustrated in FIG. 1, the switching valve 72 may be provided in the bypass flow path E1. The switching valve 72 allows oil to flow through the bypass flow path E1 or restricts oil from flowing through the bypass flow path E1. When the switching valve 72 is in the open state, the oil moves between the right damper 51R and the left damper 51L without passing through the intermediate oil chamber T1 and the damping force generating mechanisms 71R and 71L.

As illustrated in FIG. 5, a switching flow path 72a for connecting the right oil flow path ER and the left oil flow path EL is formed in the switching valve 72, for example. The switching valve 72 can move to a position (connection position) connecting the right oil flow path ER and the left oil flow path EL through the switching flow path 72a and a position (blocking position) blocking the right oil flow path ER and the left oil flow path EL. The switching valve 72 is configured to be rotatable between the connection position and the blocking position.

Figure 3B:
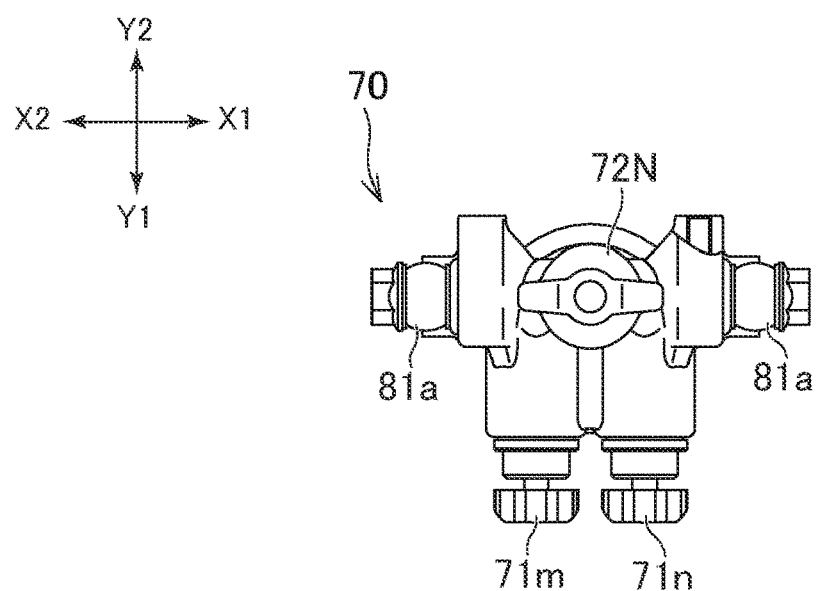
FIG. 3B is a plan view illustrating the example of the intermediate unit.

In the switching valve 72, a plurality of switching flow paths having different flow path cross sections (thickness of the flow path) may be formed. That is, a plurality of switching flow paths having different resistances to the flow of oil may be formed in the switching valve 72. Further, the movement of the switching valve 72 may be sliding along a straight line instead of rotating. As illustrated in FIGS. 3A and 3B, the switching valve 72 has a valve operation portion 72N. The valve operation portion 72N is rotatable integrally with the switching valve 72.

(Function of Switching Valve)

As the vehicle turns, oil moves from the outer damper to the inner damper via the oil flow path. For example, when the vehicle turns right, oil moves from the left damper 51L to the right damper 51R. When the vehicle turns right in a state where the switching valve 72 is located at the connection position, most of the oil moves from the left damper 51L to the right damper 51R via the bypass flow path E1 without passing through the intermediate oil chamber T1 and the damping force generating mechanisms 71R and 71L. Therefore, the left damper 51L contracts smoothly and the right damper 51R extends smoothly. As a result, the contact pressure between the right vehicle body support member and the snow or road surface can be improved. When the switching valve 72 is located at the blocking position, no oil moves via the bypass flow path E1. Therefore, when the vehicle turns right, all the oil moving from the left damper 51L to the right damper 51R passes through the damping force generating mechanisms 71R and 71L, so that a greater damping force can be obtained.

When the right damper 51R and the left damper 51L contract at the same time, for example, when the right body support member and the left body support member simultaneously ride over a bump on a snow surface or a road surface, regardless of the position of the switching valve 72, all oil flowing from the right damper 51R to the intermediate oil chamber T1 passes through the damping force generating mechanism 71R and all oil flowing from the left damper 51L to the intermediate oil chamber T1 passes through the damping force generating mechanism 71L. Therefore, a large damping force can be obtained. In this case, the intermediate oil chamber T1 of the intermediate unit 60 expands and the diaphragm 64 is largely recessed.

(Intermediate Unit having Variable Capacity)

Figure 9:
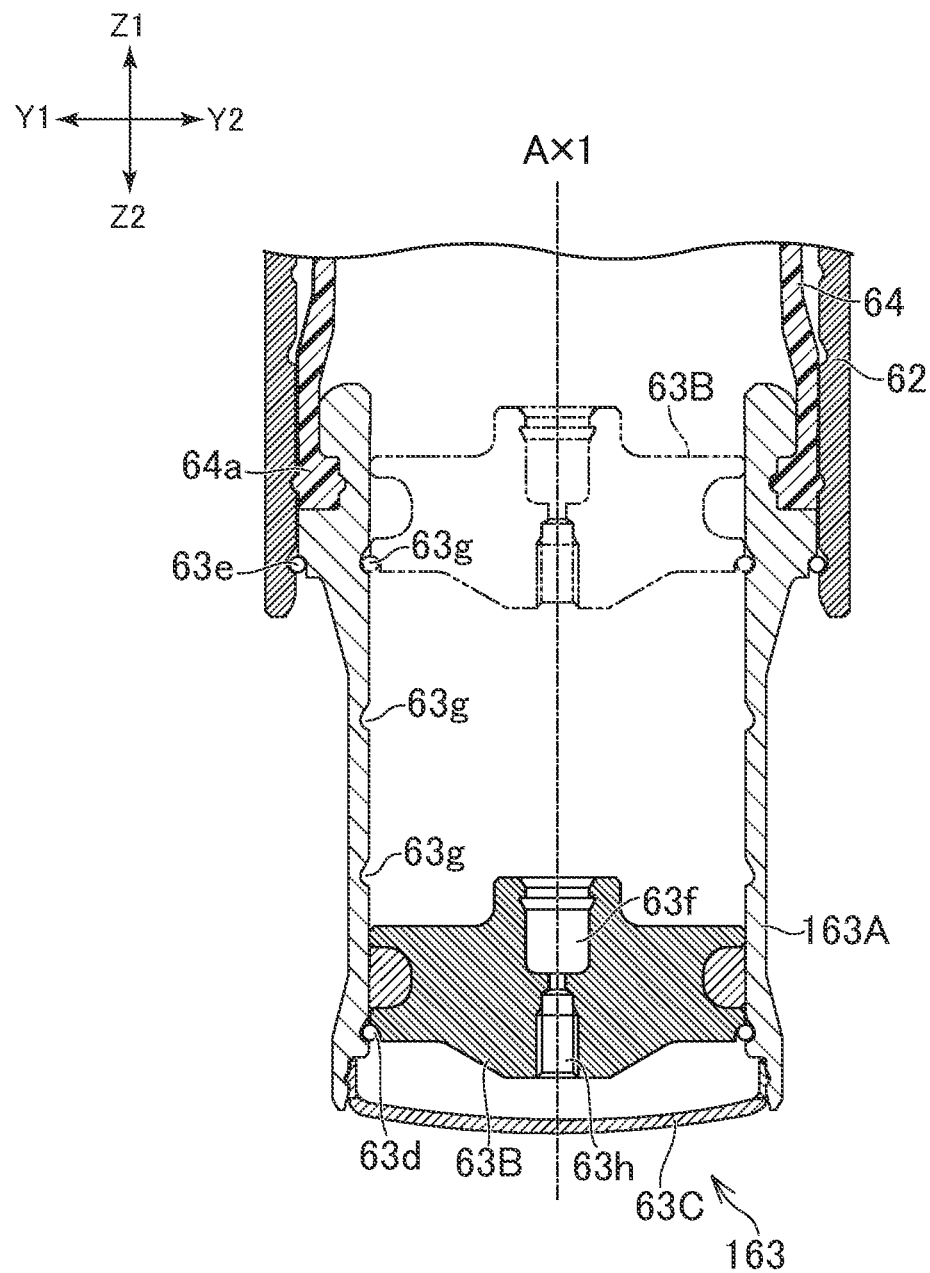
FIG. 9 is a cross-sectional view illustrating an example of the intermediate unit in which capacity of the gas chamber is variable.

The intermediate unit 60 may be configured so that the capacity of the intermediate gas chamber T2 can be changed. FIG. 9 illustrates the intermediate unit 60 having such a structure. In FIG. 9, the same members and parts as those illustrated in FIG. 4A and the like are denoted by the same reference numerals and letters. Matters not described in the structure illustrated in FIG. 9 may be the same as those illustrated in FIG. 4A and the like.

The intermediate unit 60 illustrated in FIG. 9 has a lid member 163 having a lid outer peripheral portion 163A and the lid central portion 63B fitted inside the lid outer peripheral portion 163A. The size of the lid outer peripheral portion 163A in the direction along the axis Ax1 is larger than that of the lid outer peripheral portion 63A illustrated in FIG. 4A and the like. In addition, the position of the lid central portion 63B in the lid outer peripheral portion 163A can be changed in the direction along axis Ax1. For example, a plurality of grooves 63g for fitting the stopper member 63d which defines the position of the lid central portion 63B, are formed on the inner surface of the lid outer peripheral portion 163A. The plurality of grooves 63g are arranged at intervals in the direction along the axis Ax1. The position (in other words, the capacity of the intermediate gas chamber T2) of the lid central portion 63B can be changed stepwise by changing the groove 63g in which the stopper member 63d is arranged.

In the example illustrated in FIG. 9, the position of the lid central portion 63B can be set not only at a position (the position of the lid central portion 63B indicated by the two-dot chain line) defined inside the cylindrical main body 62, but also at a position (the position defined below the lower end of cylindrical main body 62, position of the lid central portion 63B indicated by the solid line) defined outside the cylindrical main body 62.

When the capacity of the intermediate gas chamber T2 is variable, the pressure in the intermediate gas chamber T2 can be optimized. For example, when the capacity of the intermediate gas chamber T2 is reduced, the pressure in the intermediate gas chamber T2 in the most compressed state of the damper increases. (Here, the "most compressed state" is where the piston rod 53 is pushed a maximum amount into the cylinder 52, in other words, a state in which the length of the damper is minimized.) Conversely, increasing the capacity of the intermediate gas chamber T2 reduces the pressure in the intermediate gas chamber T2 in the most compressed state of the damper. The pressure in the intermediate gas chamber T2 affects the movement of the diaphragm 64. For example, when the capacity of the intermediate gas chamber T2 is reduced and the pressure in the intermediate gas chamber T2 in the most compressed state is increased, the deflection (deformation) of the diaphragm 64 as shown by the two-dot chain line in FIG. 4A becomes small. The deflection of the diaphragm 64 affects the responsiveness of the suspension system 10. Therefore, by changing the capacity of the intermediate gas chamber T2, a pressure optimized for the responsiveness of the suspension system 10 can be secured in the intermediate gas chamber T2.

Further, when there are a plurality of dampers having different sizes, it is also possible to secure an optimal capacity for the size (the size and the movable range of the piston rod 53) of the selected dampers 51R and 51L in the intermediate gas chamber T2.

Figure 10:
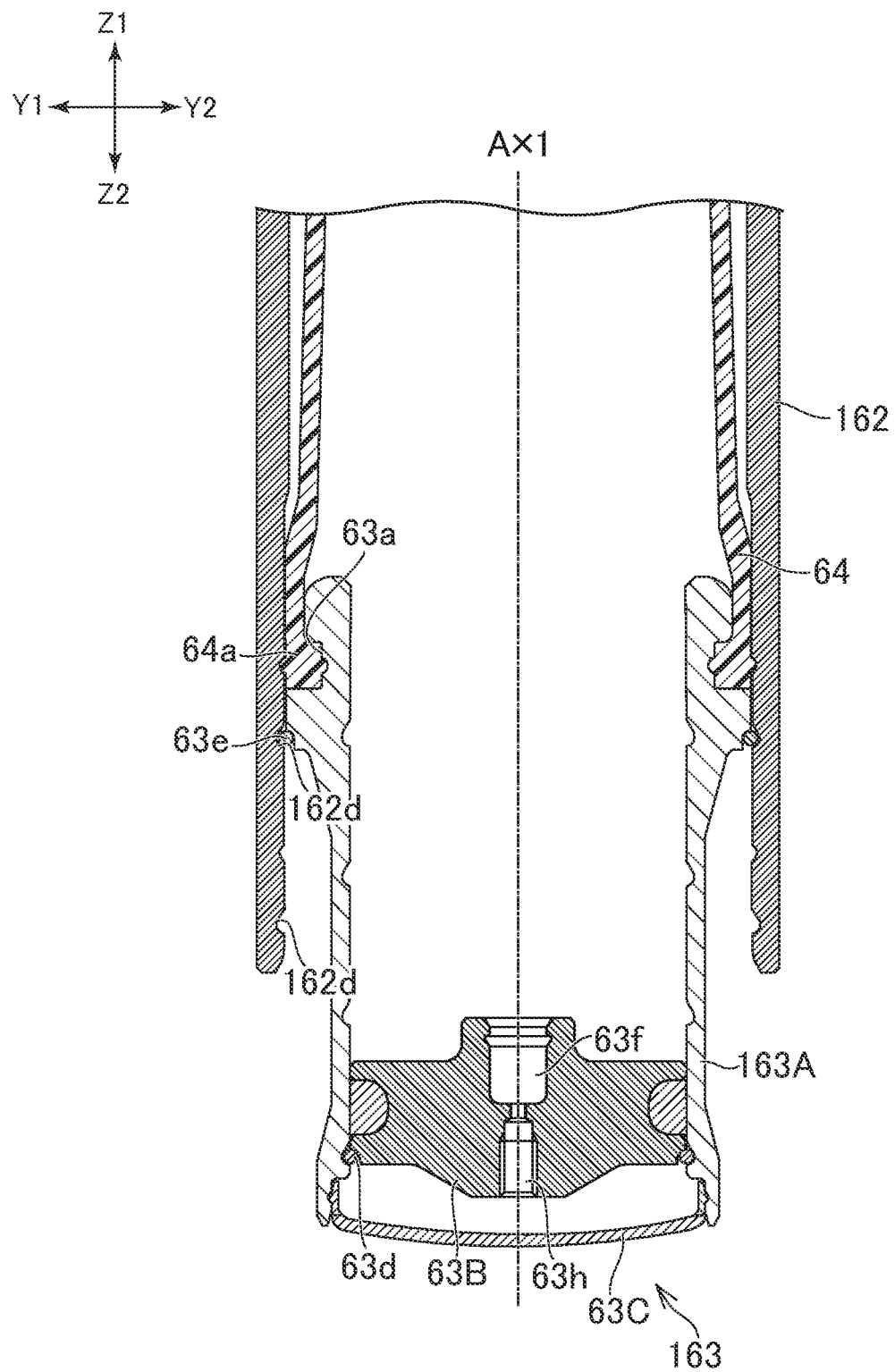
FIG. 10 is a cross-sectional view illustrating an example of the intermediate unit in which capacity of the oil chamber is variable.

The intermediate unit 60 may be configured such that the capacity of the intermediate oil chamber T1 can be changed. FIG. 10 illustrates an intermediate unit 60 having such a structure.

In FIG. 10, the same members and parts as those illustrated in FIGS. 4A and 9, and the like, are denoted by the same reference numerals and letters. Matters not described in the structure illustrated in FIG. 10 may be the same as those illustrated in FIGS. 4A and 9, and the like.

The intermediate unit 60 illustrated in FIG. 10 has a cylindrical main body 162 and a lid member 163. The position of the lid member 163 in the cylindrical main body 162 can be changed in the direction along the axis Ax1. More specifically, the position of a lid outer peripheral portion 163A in the cylindrical main body 162 can be changed in the direction along the axis Ax1. The outer peripheral edge 64a of the diaphragm 64 is caught by the engaged portion 63a of the lid outer peripheral portion 163A as in the intermediate unit 60 illustrated in FIG. 4A and the like. Therefore, the position of the outer peripheral edge 64a of the diaphragm 64 changes as the position of the lid outer peripheral portion 163A changes, whereby the capacity of the intermediate oil chamber T1 can be increased or decreased. According to this structure, when there are a plurality of dampers having different sizes, an optimal capacity for the size (the size and the movable range of the piston rod 53) of the selected dampers 51R and 51L can be secured in the intermediate oil chamber T1.

As described above, the position of the lid outer peripheral portion 163A is defined by the stopper member 63e. A plurality of grooves 162d for fitting the stopper member 63e are formed on the inner surface of the cylindrical main body 162. The plurality of grooves 162d are arranged at intervals in the direction along the axis Ax1. The position (in other words, the capacity of the intermediate oil chamber T1) of the lid outer peripheral portion 163A in the direction along the axis Ax1 can be increased or decreased stepwise by changing the groove 162d in which the stopper member 63e is arranged.

Figure 11A:
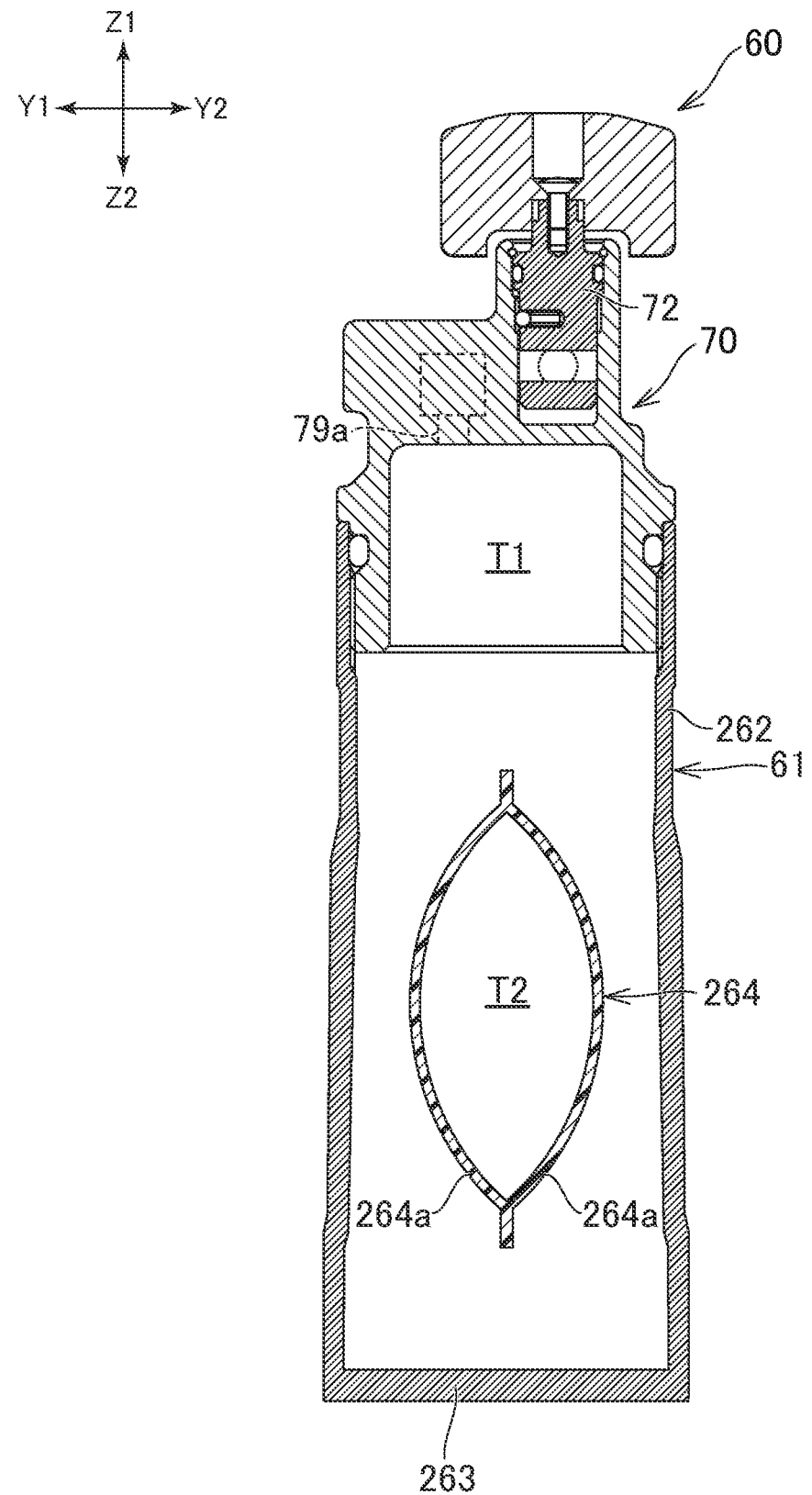
FIG. 11A is a schematic view illustrating an example of the intermediate unit having a bag-shaped partition member used as the diaphragm.
Figure 11B:
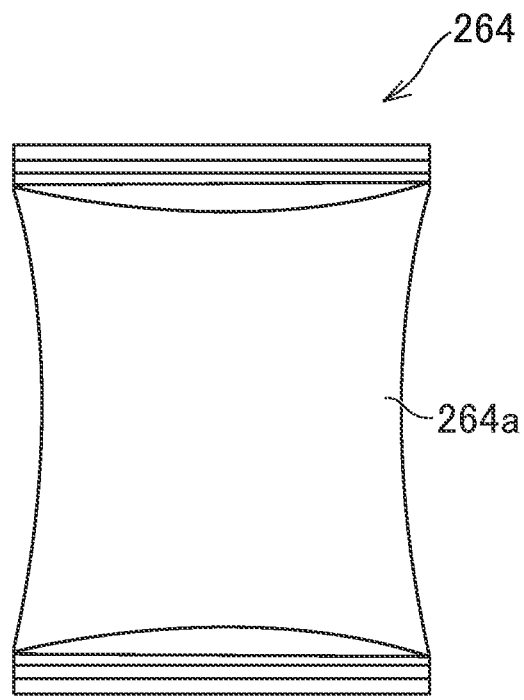
FIG. 11B is a side view of the bag-shaped partition member illustrated in FIG. 11A.

In the intermediate unit 60 described above, the intermediate gas chamber T2 is configured by the lid member 63 and the diaphragm 64. However, the intermediate gas chamber T2 may be configured by a partition member formed in a bag shape by the diaphragm. In the example illustrated in FIGS. 11A and 11B, the intermediate unit 60 has a partition member 264 formed in a bag shape. The partition member 264 has, for example, two diaphragms 264a formed of a flexible material. The edges of the diaphragms 264a are attached to each other and have the intermediate gas chamber T2 inside. The partition member 264 may be floating in the intermediate oil chamber T1 or a part of the outer surface of the partition member 264 may be fixed to the cylindrical main body 62 or the like. The material of the diaphragm 264a may be formed of, for example, polyvinyl chloride, polyethylene, polypropylene, or the like. The diaphragm 264a may be formed of rubber, or the like. In addition, the partition member 264 does not necessarily need to be configured by a plurality of diaphragms 264a. That is, the bag-shaped partition member 264 may be formed of one piece of the diaphragm 264a integrally formed of a material having flexibility. In such a structure, a cylindrical main body 262 may have a lid portion 263 instead of the lid member 63 and may be formed integrally with the lid portion 263. The material of the cylindrical main body 262 may be metal or plastic.

(Vehicle)

Figure 12:
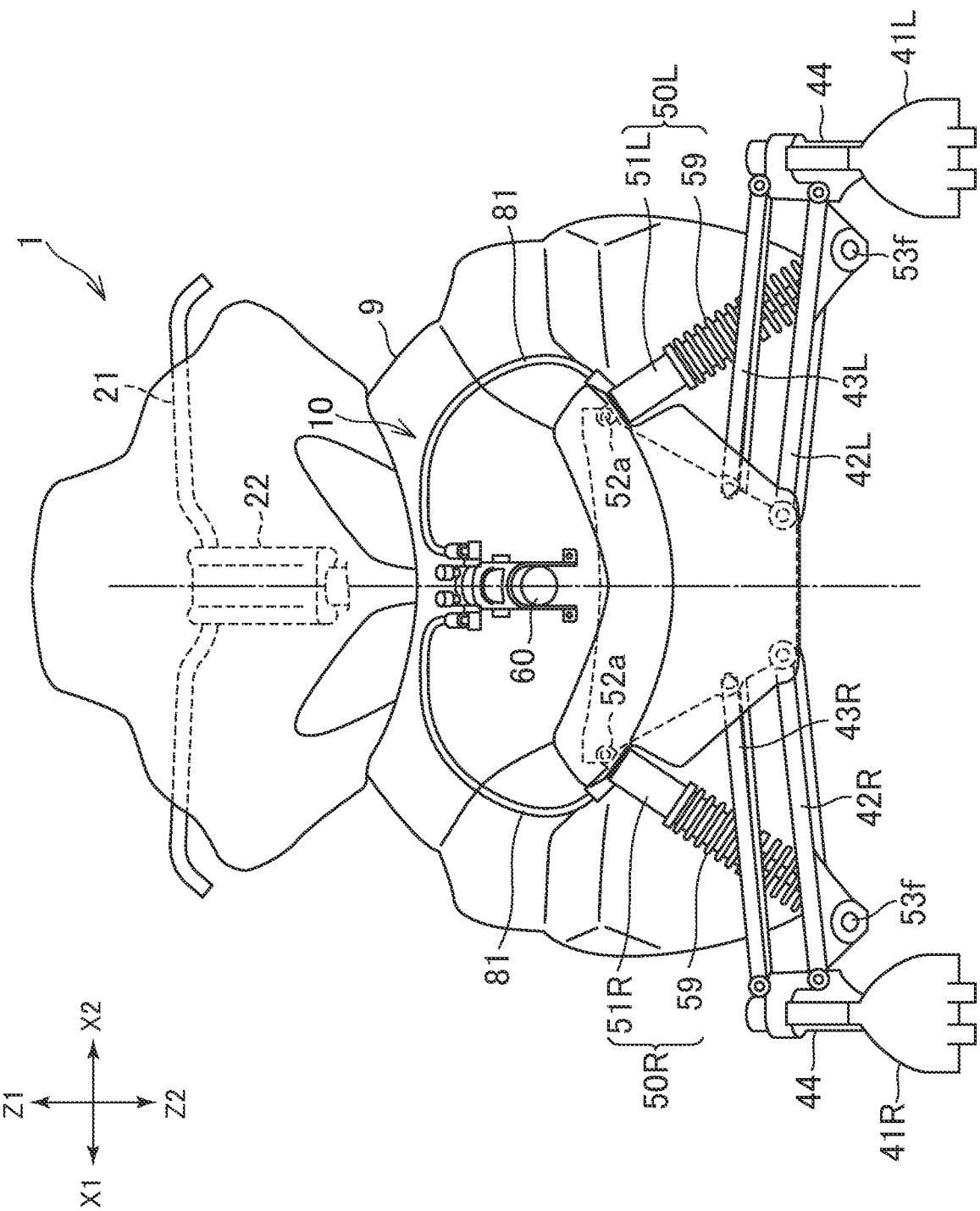
FIG. 12 is a front view of a snowmobile which is an example of a vehicle equipped with the suspension system.

FIG. 12 is a diagram illustrating an example of a vehicle on which the suspension system 10 is mounted. A snowmobile 1 is illustrated as an example of the vehicle. FIG. 12 is a front view of the snowmobile 1.

The snowmobile 1 has a right ski 41R (vehicle body support member) for supporting a vehicle body and a left ski 41L (vehicle body support member) for supporting the vehicle body. The right ski 41R is supported by a lower arm 42R and an upper arm 43R. Similarly, the left ski 41L is supported by a lower arm 42L and an upper arm 43L. The right arms 42R and 43R extend rightward from a proximal portion connected to a vehicle body frame, and their distal end portions are connected to a knuckle 44. The right ski 41R is connected to the lower end of the knuckle 44. The left arms 42L and 43L extend leftward from a proximal portion connected to the vehicle body frame and their distal end portions are connected to the knuckle 44 to which the left ski 41L is connected. This allows the skis 41R and 41L to move up and down relatively to the vehicle body frame.

In the exampled snowmobile 1, the dampers 51R and 51L are arranged such that the cylinder 52 is located at the upper part thereof and the piston rod 53 is located at the lower part thereof. The upper ends 52a of the cylinders 52 of the dampers 51R and 51L are connected to the vehicle body frame. The lower end 53f of the piston rod 53 of the right damper 51R is connected to the lower arm 42R. Similarly, the lower end 53f of the piston rod 53 of the left damper 51L is connected to the lower arm 42L. As described above, the springs 59 are provided in the dampers 51R and 51L. The intermediate unit 60 is arranged, for example, above a front cover 9 which covers an upper side of a front part of the vehicle body. The valve operation portions 72N, 71m, and 71n (see FIG. 3A) are located outside the cover 9. The layout of the intermediate unit 60 is not limited to the example of the snowmobile 1. For example, the intermediate unit 60 may be disposed inside the cover 9 and the valve operation portions 72N, 71m, and 71n may be covered by a lid which can be opened or closed.

Figure 13:
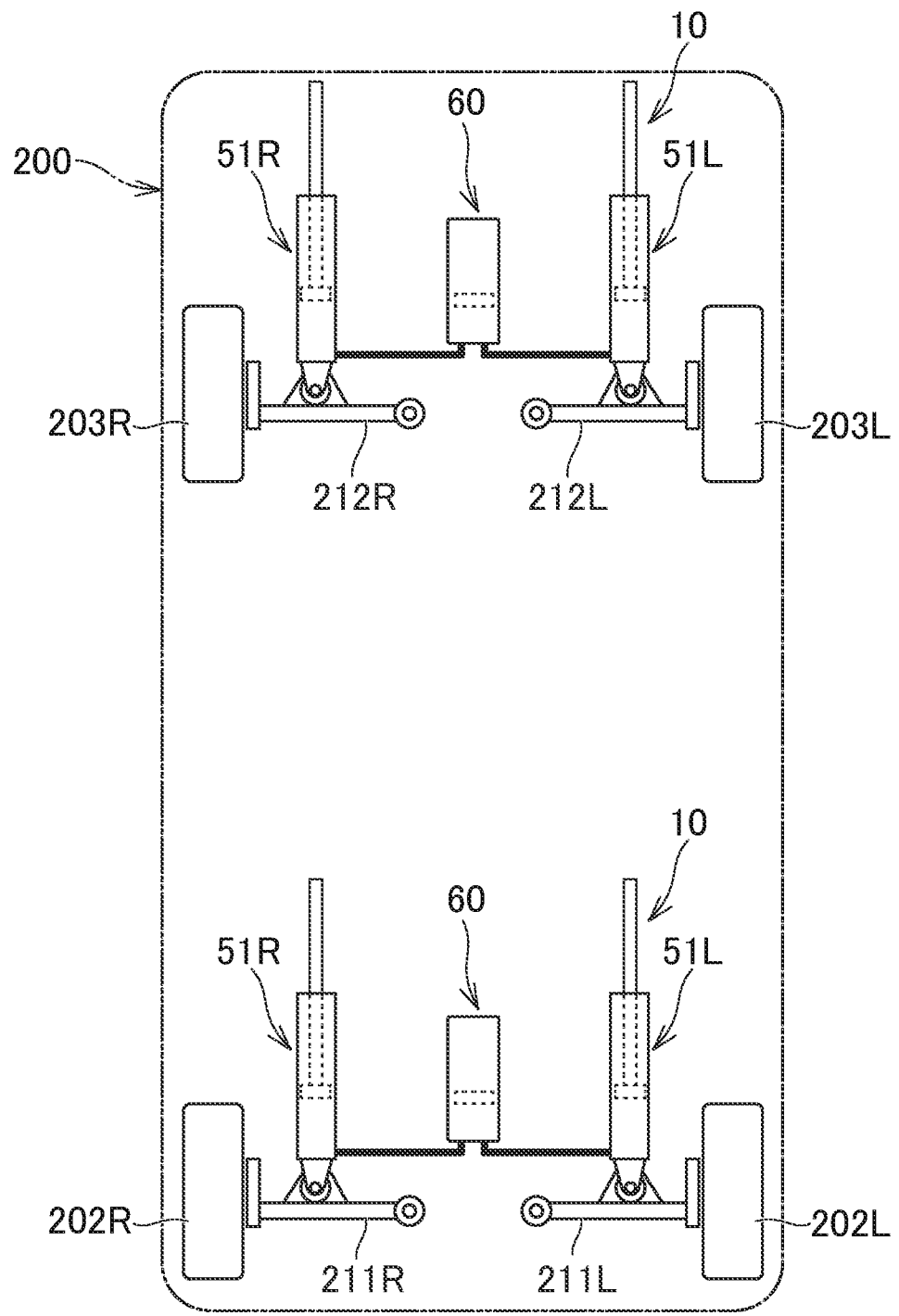
FIG. 13 is a schematic view of a four-wheeled vehicle which is an example of a vehicle equipped with the suspension system.

The suspension system 10 may be mounted on a four-wheeled vehicle. FIG. 13 is a diagram illustrating an example of a four-wheeled vehicle 200 equipped with the suspension system 10. The four-wheeled vehicle 200 is, for example, an ATV or an ROV.

The four-wheeled vehicle 200 has four wheels 202R, 202L, 203R, and 203L as vehicle body support members. The four-wheeled vehicle 200 has arms 211R, 211L, 212R, and 212L which connect the wheels 202R, 202L, 203R, and 203L to the vehicle body frame. In the exampled four-wheeled vehicle 200, a suspension system 10 is applied to the right and left front wheels 202R and 202L and another suspension system 10 is applied to the right and left rear wheels 203R and 203L. That is, the lower end (the end portion of the cylinder 52 in the example of FIG. 13) of the right damper 51R of the (front) suspension system 10 is connected to the arm 211R which supports the front wheel 202R and the lower end of the left damper 51L is connected to the arm 211L which supports the front wheel 202L. Similarly, the lower end (the end portion of the cylinder 52 in the example of FIG. 13) of the right damper 51R of the (rear) suspension system 10 is connected to the arm 212R which supports the rear wheel 203R and the lower end of the left damper 51L is connected to the arm 212L which supports the rear wheel 203L.

The four-wheeled vehicle on which the suspension system 10 is mounted is not limited to the exampled four-wheeled vehicle 200 illustrated in FIG. 13. For example, a suspension system 10 may be applied to the right front wheel 202R and the rear wheel 203R, and another suspension system 10 may be applied to the left front wheel 202L and the rear wheel 203L. As yet another example, a suspension system 10 may be applied to the right front wheel 202R and the left rear wheel 203L and another suspension system may be applied to the left front wheel 202L and the right rear wheel 203R.

SUMMARY (1) The suspension system 10 includes the right damper 51R having the cylinder 52 in which the oil chambers R1 and R2 are formed, the left damper 51L having the cylinder 52 in which the oil chambers R1 and R2 are formed, and the intermediate unit 60. The intermediate unit 60 includes the intermediate case 61 having the intermediate oil chamber T1 connected to the oil chamber R1 of the right damper 51R and the oil chamber R1 of the left damper 51L and the intermediate gas chamber T2. The intermediate unit 60 includes the diaphragm 64 formed of a flexible material which partitions the intermediate oil chamber T1 and the intermediate gas chamber T2. In this suspension system 10, unlike a system in which a free piston is used, when one of the intermediate oil chamber T1 and the intermediate gas chamber T2 expands and the other contracts due to the compression/expansion of the dampers 51R and 51L, the generation of friction in the intermediate unit 60 can be suppressed.

(2) The diaphragm 64 is formed of rubber. According to this, the cost of the intermediate unit 60 can be reduced.

(3) The diaphragm 64 has the outer peripheral edge 64a of which the position in the intermediate case 61 is fixed. The diaphragm 64 has a shape bulging from the outer peripheral edge 64a toward the intermediate oil chamber T1. According to this shape of the diaphragm 64, the surface area of the diaphragm 64 is increased, so that the deflection of the diaphragm 64 can smoothly occur. As a result, when the dampers 51R and 51L compress and expand, one of the intermediate oil chamber T1 and the intermediate gas chamber T2 can expand smoothly and the other can contract smoothly.

(4) The intermediate case 61 has the cylindrical main body 62 having an open end portion and the lid member 63 for closing the end portion of the cylindrical main body 62. The diaphragm 64 has an outer peripheral edge of which the position in the intermediate case 61 is fixed. The outer peripheral edge 64a is attached to the cylindrical main body 62 by the lid member 63. According to this structure, the work of attaching the diaphragm 64 to the intermediate unit can be simplified.

(5) The lid member 63 includes the annular lid outer peripheral portion 63A, the lid central portion 63B fitted inside the lid outer peripheral portion 63A, and the sealing member 63c located between the lid outer peripheral portion 63A and the lid central portion 63B. The sealing member 63c is located inside the outer peripheral edge 64a.

(6) In the lid member 63, the gas pressure adjusting hole 63h, which is a hole that allows gas to be injected into and discharged from the intermediate gas chamber T2, is formed. According to this structure, the operation of optimizing the gas pressure in the intermediate gas chamber T2 can be facilitated.

(7) The intermediate unit 60 includes the damping force generating mechanism 71R located on the right oil flow path ER which is the flow path between the intermediate oil chamber T1 and the oil chamber R1 of the right damper 51R and the damping force generating mechanism 71L located on the left oil flow path EL which is the flow path between the intermediate oil chamber T1 and the oil chamber R1 of the left damper 51L. According to this structure, the damping force can be optimized according to the driving situation. For example, the balance between the damping force obtained when the vehicle body rolls and the damping force obtained when the vehicle body pitches can be optimized as compared to a structure in which the damping force generating mechanism is provided only in the dampers 51R and 51L.

(8) The intermediate unit 60 includes the bypass flow path E1 connecting the right oil flow path ER and the left oil flow path EL without passing through the damping force generating mechanism 71R and the damping force generating mechanism 71L and the switching valve 72 for opening or closing the bypass flow path E1. According to this structure, the movement of oil between the two dampers 51R and 51L can be smoothly performed by using the bypass flow path E1.

(9) The damping force generating mechanism 71R and the damping force generating mechanism 71L are fixed to one end portion of the intermediate case 61. The position of the outer peripheral edge 64a of the diaphragm 64 is fixed to the other end portion of the intermediate case 61. The diaphragm 64 has a shape which bulges from the outer peripheral edge 64a of the diaphragm 64 to the damping force generating mechanisms 71R and 71L. According to this arrangement of the diaphragm, when oil flows into the intermediate oil chamber T1 through the two damping force generating mechanisms 71R and 71L, the diaphragm 64 is bent so as to be recessed. As a result, the expansion of the intermediate oil chamber T1 can occur smoothly.

(10) The intermediate case 61 includes the cylindrical main body 62 having an open end portion and the lid member 63 for closing the end portion of the cylindrical main body 62. The outer peripheral edge 64a of the diaphragm 64 is attached to the cylindrical main body 62 by the lid member 63. According to this structure, the work of attaching the diaphragm 64 to the intermediate unit 60 can be simplified.

(11) The diaphragm bulges in the direction along the axis Ax1 of the cylindrical main body 62. Further, when the intermediate unit 60 is viewed in the direction along the axis Ax1, the damping force generating mechanism 71R on the right side and the damping force generating mechanism 71L on the left side are symmetrically arranged with respect to the vertical plane Pv passing through the center of the diaphragm 64. This can reduce the imbalance of the pressure acting on the outer surface of the diaphragm 64.

(12) The area of the diaphragm 64 is larger than the sum of the cross-sectional area of the cylinder 52 of the right damper 51R and the cross-sectional area of the cylinder 52 of the left damper 51L. According to this structure, the area of the diaphragm 64 is sufficiently ensured, so that the deflection of the diaphragm 64 can smoothly occur. As a result, when the dampers 51R and 51L are compressed or expanded, one of the intermediate oil chamber T1 and the intermediate gas chamber T2 can expand smoothly and the other can contract smoothly.

(13) Each of the right damper 51R and the left damper 51L has the piston 54 arranged in the cylinder 52 and the piston rod 53 extending from the piston 54 and projecting from the cylinder 52. The piston rod 53 of the right damper 51R has a part which is located within the cylinder 52 when the right damper is in the most compressed state. The piston rod 53 of the left damper 51L has a part which is located within the cylinder when the second damper is in a most compressed state. When the part of the piston rod of the first damper has a first volume and the part of the piston rod of the second damper has a second volume, a capacity of the intermediate gas chamber is larger than the sum (V1+V2) of the first volume and the second volume. By increasing the capacity of the intermediate gas chamber T2 in this way, the movement of the pistons 54 of the dampers 51R and 51L can be smoothed.

(Other Examples)

The suspension system proposed in the present disclosure is not limited to the example of the suspension system 10 described above and various changes may be made.

For example, the intermediate unit 60 may not have the bypass flow path E1 and the switching valve 72 provided on the way of the bypass flow path E1.

Although the number of damping force generating mechanisms that the intermediate unit 60 has is two, the number of damping force generating mechanisms may be one. In this case, the damping force generating mechanism is preferably provided between the right oil flow path ER and the left oil flow path EL.

In the exampled intermediate unit 60, the diaphragm 64 is attached to the cylindrical main body 62 by the lid member 63. That is, the outer peripheral edge 64a of the diaphragm 64 is interposed between the lid member 63 and the cylindrical main body 62. However, the diaphragm 64 may be attached only to the lid member 63. For example, the outer peripheral edge 64a of the diaphragm 64 may be interposed between the lid outer peripheral portion 63A and the lid central portion 63B.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A suspension system, comprising:
a first damper having a cylinder in which an oil chamber is formed;
a second damper having a cylinder in which an oil chamber is formed; and
an intermediate unit including a case which includes an intermediate oil chamber connected to the oil chamber of the first damper and the oil chamber of the second damper and an intermediate gas chamber, the intermediate unit further including a diaphragm formed of a flexible material which partitions the intermediate gas chamber from the intermediate oil chamber;
wherein the case has a cylindrical main body which includes an open end portion and a lid member which is disposed inside the open end portion to close the open end portion, and
the diaphragm has an outer peripheral edge of which a position is fixed, the outer peripheral edge being sandwiched and fixed between an outer peripheral surface of the lid member and an inner surface of the cylindrical main body, and the diaphragm has a shape bulging from the outer peripheral edge toward the intermediate oil chamber.

2. The suspension system according to claim 1, wherein the diaphragm is made of rubber.

3. The suspension system according to claim 1, wherein the lid member has an annular outer peripheral portion, a central portion fitted inside the outer peripheral portion, and a sealing member disposed between the outer peripheral portion and the central portion, and
the sealing member is located inside the outer peripheral edge of the diaphragm.

4. The suspension system according to claim 3, wherein the lid member further comprises two stoppers.

5. The suspension system according to claim 3, wherein the lid member further comprises an annular stopping member which defines the position of the annular outer peripheral portion.

6. The suspension system according to claim 3, wherein the diaphragm has an end in an axis direction of the cylindrical main body, the end being located closer to the open end portion of the cylindrical main body than the sealing member.

7. The suspension system according to claim 1, wherein the lid member is formed with a gas pressure adjusting hole, which is a hole that allows gas to be injected into and discharged from the intermediate gas chamber.

8. The suspension system according to claim 1, wherein the intermediate unit has a first damping force generating mechanism located on a first oil flow path which is a flow path between the intermediate oil chamber and the oil chamber of the first damper and a second damping force generating mechanism located on a second oil flow path which is a flow path between the intermediate oil chamber and the oil chamber of the second damper.

9. The suspension system according to claim 8, wherein the intermediate unit includes a bypass flow path connecting the first oil flow path and the second oil flow path without passing through the first damping force generating mechanism and the second damping force generating mechanism and a valve to open or close the bypass flow path.

10. The suspension system according to claim 8, wherein the first damping force generating mechanism and the second damping force generating mechanism are provided at a first end portion of the case,
the outer peripheral edge is positioned in a second end portion of the case, and
the diaphragm has the shape which bulges from the outer peripheral edge of the diaphragm toward the first damping force generating mechanism and the second damping force generating mechanism.

11. The suspension system according to claim 10, wherein the diaphragm is bulged in a first direction, and
the first damping force generating mechanism and the second damping force generating mechanism are symmetrically arranged with respect to a plane passing through a center of the diaphragm when the intermediate unit is viewed in the first direction.

12. The suspension system according to claim 1, wherein an area of the diaphragm is larger than a sum of a cross-sectional area of the cylinder of the first damper and a cross-sectional area of the cylinder of the second damper.

13. The suspension system according to claim 1, wherein each of the first damper and the second damper has a piston disposed within the cylinder and a piston rod extending from the piston and protruding from the cylinder,
the piston rod of the first damper has a part which is located within the cylinder when the first damper is in a most compressed state,
the piston rod of the second damper has a part which is located within the cylinder when the second damper is in a most compressed state,
the part of the piston rod of the first damper has a first volume,
the part of the piston rod of the second damper has a second volume, and
a capacity of the intermediate gas chamber is larger than a sum of the first volume and the second volume.

14. The suspension system according to claim 1, wherein the diaphragm has a bag shape.

15. The suspension system according to claim 1, wherein the diaphragm includes a body portion of a cylindrical shape and a top portion of a hemispherical shape located at an end portion of the body portion.

16. The suspension system according to claim 1, wherein the diaphragm bends in a concave manner.

17. The suspension system according to claim 1, wherein the intermediate unit further comprises a stopper which defines the position of the lid member in the cylindrical main body.

18. A vehicle, comprising:
a suspension system;
a vehicle body frame; and
wheels or skis connected to the frame through the suspension system, wherein the suspension system comprises:
a first damper having a cylinder in which an oil chamber is formed;
a second damper having a cylinder in which an oil chamber is formed; and
an intermediate unit including a case which includes an intermediate oil chamber connected to the oil chamber of the first damper and the oil chamber of the second damper and an intermediate gas chamber, the intermediate unit further including a diaphragm formed of a flexible material which partitions the intermediate gas chamber from the intermediate oil chamber;
wherein the case has a cylindrical main body which includes an open end portion and a lid member which is disposed inside the open end portion to close the open end portion, and
the diaphragm has an outer peripheral edge of which a position is fixed, the outer peripheral edge being sandwiched and fixed between an outer peripheral surface of the lid member and an inner surface of the cylindrical main body, and the diaphragm has a shape bulging from the outer peripheral edge toward the intermediate oil chamber.

* * * * *